(12) United States Patent
Fisher et al.

(10) Patent No.: US 9,555,371 B2
(45) Date of Patent: Jan. 31, 2017

(54) SELECTIVE CATALYTIC REDUCTION PROCESSES USING DOPED CERIAS

(71) Applicant: Johnson Matthey Public Limited Company, London (GB)

(72) Inventors: Janet Mary Fisher, Reading (GB); Raj Rao Rajaram, Slough (GB); David Thompsett, Caversham (GB); Jillian Elaine Collier, Caversham (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/576,649

(22) Filed: Dec. 19, 2014

(65) Prior Publication Data

US 2015/0182912 A1    Jul. 2, 2015

Related U.S. Application Data

(60) Provisional application No. 61/921,619, filed on Dec. 30, 2013.

(51) Int. Cl.
*B01D 53/94* (2006.01)
*B01J 23/10* (2006.01)
(Continued)

(52) U.S. Cl.
CPC ....... *B01D 53/9413* (2013.01); *B01D 53/9418* (2013.01); *B01J 23/20* (2013.01);
(Continued)

(58) Field of Classification Search
CPC . B01J 23/10; B01J 37/0201; B01J 2523/3712; B01D 53/9413; F01N 3/2066; F01N 3/035
See application file for complete search history.

(56) References Cited

U.S. PATENT DOCUMENTS

| 4,661,330 A | 4/1987 | Chane-Ching et al. |
| 4,859,432 A | 8/1989 | David et al. |

(Continued)

FOREIGN PATENT DOCUMENTS

| EP | 0444470 A1 | 9/1991 |
| EP | 2368628 A1 | 9/2011 |

(Continued)

OTHER PUBLICATIONS

Casapu, et al., "Screening of Doped MnOx-CeO2 Catalysts for Low-temperature NO-SCR," Applied Catalysis B: Environmental 88 (2009) pp. 413-419.

(Continued)

*Primary Examiner* — Timothy Vanoy
(74) *Attorney, Agent, or Firm* — Jimmie D. Johnson

(57) ABSTRACT

Niobia- and tantala-doped ceria catalysts, their use in selective catalytic reduction (SCR) processes, and a compact after-treatment system for exhaust gases are disclosed. In some aspects, the catalyst comprises at least 91 wt. % of ceria and 0.1 to 9 wt. % of niobia or tantala doped on the ceria. While conventional SCR catalysts can deactivate at higher temperatures, the doped cerias, particularly ones having as little as 1 or 2 wt. % of $Nb_2O_5$ or $Ta_2O_5$, are activated toward NOx conversion by calcination. The doped cerias are also valuable for SCRF® catalyzed filter applications, including an after-treatment system that comprises a diesel particulate filter having inlets and outlets, and a dual-function catalyst coated on the inlets, outlets, or both. Compared with conventional SCR catalysts, the niobia or tantala-doped cerias enable a higher level of $NO_2$ to be present.

21 Claims, 14 Drawing Sheets

(51) Int. Cl.
*F01N 3/28* (2006.01)
*B01J 23/20* (2006.01)
*B01J 37/03* (2006.01)
*B01J 37/02* (2006.01)
*B01J 37/08* (2006.01)
*B01J 35/00* (2006.01)
*B01J 23/648* (2006.01)
*B01J 35/10* (2006.01)

(52) U.S. Cl.
CPC ......... *B01J 35/002* (2013.01); *B01J 37/0201* (2013.01); *B01J 37/0203* (2013.01); *B01J 37/03* (2013.01); *B01D 2251/2062* (2013.01); *B01D 2255/207* (2013.01); *B01D 2255/2065* (2013.01); *B01D 2255/9155* (2013.01); *B01D 2258/012* (2013.01); *B01J 23/6484* (2013.01); *B01J 23/6486* (2013.01); *B01J 35/0006* (2013.01); *B01J 35/1019* (2013.01); *B01J 37/0211* (2013.01); *B01J 37/0236* (2013.01); *B01J 37/0244* (2013.01); *B01J 37/0248* (2013.01); *B01J 37/033* (2013.01); *B01J 37/08* (2013.01); *B01J 2523/00* (2013.01)

(56) References Cited

U.S. PATENT DOCUMENTS

| | | | |
|---|---|---|---|
| 4,902,487 | A | 2/1990 | Cooper et al. |
| 5,063,193 | A | 11/1991 | Bedford et al. |
| 6,605,264 | B2 | 8/2003 | Bortun et al. |
| 7,094,383 | B2 | 8/2006 | Wang et al. |
| 2010/0170230 | A1 | 7/2010 | Chiffey et al. |
| 2010/0180580 | A1 | 7/2010 | Boorse et al. |
| 2013/0120190 | A1 | 5/2013 | Mccune, Jr. |
| 2013/0195743 | A1* | 8/2013 | Hernandez ......... B01D 53/9418 423/213.2 |
| 2013/0210617 | A1 | 8/2013 | Hernandez et al. |
| 2014/0044629 | A1 | 2/2014 | Bisson et al. |

FOREIGN PATENT DOCUMENTS

| | | |
|---|---|---|
| WO | 0136332 A1 | 5/2001 |
| WO | 2012004263 A1 | 1/2012 |
| WO | 2012041921 A2 | 4/2012 |
| WO | 2012166833 A1 | 12/2012 |
| WO | 2013037507 A1 | 3/2013 |

OTHER PUBLICATIONS

Casapu, et al. "A Niobia-Ceria Based Multi-Purpose Catalyst for Selective Catalytic Reduction of NOx, Urea Hydrolysis and Soot Oxidation in Diesel Exhaust," Applied Catalysis B: Environmental 103 (2011) pp. 79-84.

Casapu, et al., Characterization of Nb-Containing MnOx-Ce02 Catalyst for Low-Temperature Selective Catalytic Reduction of NO with NH3, J. Phys. Chem. C 114 (2010) pp. 9791-9801.

LeGal, et al., "Dopant Incorporation in Ceria for Enhanced Water-Splitting Activity During Solar Thermochemical Hydrogen Generation," J. Phys. Chem. C 116 (2012) pp. 13516-13523.

Ramirez-Cabrera, et al., "The Influence of Point Defects on the Resistance of Ceria to Carbon Deposition in Hydrocarbon Catalysis," Solid State Ionics 136-137 (2000) pp. 825-831.

Yashiro, et al. "Electrical Properties and Defect Structure of Niobia-Doped Ceria," Solid State Ionics 175 (2004) pp. 341-344.

Zhao, et al., "The Effect of Oxide Dopants in Ceria on n-butane Oxidation," Applied Catalysis A: General 248 (2003) pp. 9-18.

Nolan, Michael; Formation of Ce3+ at the cerium Dioxide (1 1 0) surface by doping; Chemical Physics Letters 492 (2010) 115-118.

* cited by examiner

SELECTIVE CATALYTIC REDUCTION PROCESSES USING DOPED CERIAS

FIELD OF THE INVENTION

The invention relates to selective catalytic reduction processes utilizing ceria doped with low levels of niobia or tantala as a catalyst.

BACKGROUND OF THE INVENTION

Hydrocarbon combustion in diesel engines, stationary gas turbines, and other systems generates exhaust gas that must be treated to remove nitrogen oxides (NOx), including NO, $NO_2$, and $N_2O$. The exhaust generated in lean-burn engines is generally oxidative, and the NOx needs to be reduced selectively with a heterogeneous catalyst and a reductant, which is typically ammonia or a short-chain hydrocarbon. The process, known as selective catalytic reduction (SCR), has been thoroughly investigated.

Various combinations of ceria and Group 5 metals (V, Nb, Ta) have been used for SCR and other catalytic processes. Usually, at least 10 wt. % of the Group 5 metal or Group 5 metal oxide is present in the catalyst, as is evident from a review of related academic publications.

Le Gal et al. (*J. Phys. Chem. C* 116 (2012) 13516), for instance, teach doping of ceria with 10 to 50 atom % of tantalum. The catalysts are made by co-precipitating hydroxides from cerium nitrate and tantalum(V) chloride precursors. The authors concluded that tantalum substitutes for cerium in the normal fluorite structure of ceria, as indicated by contraction of the lattice parameter with increasing amounts of Ta. The catalysts are used for water splitting during solar thermochemical hydrogen generation.

S. Zhao et al. (*Appl. Catal. A* 248 (2003) 9) studied the effect of oxide dopants in ceria on n-butane oxidation. Catalysts having 10 at. % of Nb or Ta were prepared using a sol-gel method by reacting cerium(III) nitrate hexahydrate with niobium(V) chloride or tantalum(V) chloride. After dissolving the salts in water, the solutions were dried and calcined. The catalysts were not used for selective catalytic reduction.

K. Yashiro et al. (*Solid State Ionics* 175 (2004) 341) prepared "niobia-doped cerias" having less than 1 at. % of niobium and measured their electrical conductivity. The title is a misnomer because the ceria is actually prepared in the presence of preformed niobia. In particular, an aqueous solution of cerium(III) nitrate is combined with a mixture of oxalic acid and well-dispersed $Nb_2O_5$ powder. Cerium oxalate precipitates with dispersed particles of niobia. The precursor is then calcined at 1400° C. The product is not used for an SCR process.

E. Ramirez-Cabrera et al. (*Solid State Ionics* 136-137 (2000) 825) teach niobia-doped cerias and their use to convert methane to synthesis gas. The doped cerias contained 0.7 or 2.5 mole % of $Nb_2O_5$ and were made by co-precipitation of cerium and niobium hydroxides, followed by calcination.

In a series of papers (*Appl. Catal. B* 103 (2011) 79; *Appl. Catal. B* 88 (2009) 413; and *J. Phys. Chem. C* 114 (2010) 9791), M. Casapu et al. describe niobia-ceria catalysts and their use for SCR and soot oxidation. The catalysts tested contained 10 wt. % $Nb_2O_5$ on a mixed ceria-zirconia support or 30 wt. % $Nb_2O_5$ on ceria. The catalysts were made by co-precipitation or by wet mixing ammonium niobate oxalate with ceria. Interestingly, these catalysts become less active for NOx reduction upon calcination or hydrothermal aging at elevated temperatures (see, e.g., FIG. 9 (*a*) and (*b*) in *Appl. Catal. B* 103 (2011) 79), i.e., the opposite of what we found.

Combinations of niobia and ceria are also discussed in patents and published patent applications. As with the papers discussed in the preceding paragraph, EP 2368628 describes catalysts comprising at least 10 wt. % ceria and at least 10 wt. % of niobia and their use for an SCR process. The catalysts are prepared by co-precipitation or wet mechanical mixing, followed by calcination at elevated temperature (550° C. or 800° C.). In the latter case, ammonium niobate (V) oxalate hydrate is combined with ceria, and the resulting slurry is dried overnight at 80° C. and is thereafter calcined at 550° C. As shown in FIGS. 5 and 7, these catalysts become much less active when they are calcined for 12 hours at 800° C.

U.S. Publ. No. 2013/0121902 teaches mixed oxides of ceria, zirconia, niobia, and a rare earth sesquioxide as catalysts for an SCR process. Addition of niobia to the commercially available catalyst from ceria, zirconia, and the rare earth oxide is said to improve aging stability. The catalysts generally have high levels of zirconia. In one example with a low percentage of niobia (3 wt. %), the catalyst has 43% zirconia and 9% $Nd_2O_3$.

U.S. Pat. No. 6,605,264 teaches niobium containing zirconium-cerium based solid solutions and their use as "high oxygen ion conducting" or oxygen storage materials. The solid solutions comprise "up to about 95 mole % zirconium, up to about 50 mole % cerium, about 0.5 to 15 mole % rare earth metal(s) and about 0.5 to about 15 mole % niobium." All of the examples have more than 50 mole % zirconium.

Catalysts comprising niobia and ceria and their use for SCR applications are disclosed in a series of international applications (see PCT Int. Appl. Nos. WO 2012/041921, WO 2012/004263, and WO 2013/037507). In the '263 publication, the proportion of niobium oxide to cerium oxide is 2 to 20%. Catalysts having <50% Zr are shown to have greater capability for reducing hydrogen compared with a similar catalyst made with 77.6% Zr. In two examples (Exs. 9 and 10), 3.2 wt. % or 8.6 wt. % of $Nb_2O_5$ is present, zirconia is omitted, and the balance is ceria. However, these catalysts are essentially ceria-encapsulated niobias rather than niobia "doped on" ceria. As shown in the examples, the catalysts are made by forming ceria in the presence of a smaller proportion of pre-formed niobia. Our own work (described herein) demonstrates that at identical proportions of niobia and ceria, these catalysts are less effective for NOx reduction than compositions in which the niobia is doped on ceria. Moreover, as shown in the '921 publication (Table 5, Exs. 9 and 10), these catalysts also appear to deactivate upon hydrothermal aging (750° C., 16 h).

New emission limits for diesel vehicles target both NOx and particulates. Commonly, this requires the use of two separate systems: an $NH_3$-SCR system to remove NOx and a catalytic soot filter (see, e.g., U.S. Pat. No. 4,902,487) or a diesel particulate filter ("DPF"; see, e.g., U.S. Publ. No. 2010/0170230) to mechanically capture and oxidize soot. The soot accumulates on the filter surface, generates backpressure, and eventually needs to be burned off at elevated temperatures. Because most SCR catalysts are unable to withstand these high temperatures, separate systems are needed. However, because space is limited, designers would like to combine the SCR and soot oxidation functions into a single, compact after-treatment unit, which is typically the DPF (see, e.g., U.S. Publ. No. 2010/0180580). Such a combined system, known in the industry as an SCRF® catalyzed filter (product of Johnson Matthey), will have a catalyst that is exposed to soot, $NH_3$, NO, and $NO_2$. Although $NO_2$ is beneficial for passively oxidizing soot that accumulates on the filter, it is normally consumed in the $NH_3$-SCR reaction. Thus, depending on the configuration, the $NH_3$-SCR and soot oxidation catalysts may need to compete for available $NO_2$. With current SCR catalysts (e.g., transition metals dispersed in zeolites or mixed oxides such as the $V_2O_5$—$WO_3$—$TiO_2$ system), conversion of $NO_2$ is much faster than the oxidation of soot by $NO_2$. This difference in reactivity therefore limits the usefulness of known SCR catalysts for passive soot oxidation.

To minimize consumption of $NO_2$ in the fast SCR reaction, the SCR catalyst can be coated on just the outlet channels of the DPF. This strategy was used in making the dual function catalytic filter described in PCT Int. Appl. No. WO 2012/166833. As shown in FIG. 1 of the '833 publication, the filter features a soot oxidation catalyst zone positioned closest to the direction of the exhaust gas flow, and an SCR catalyst zone positioned on the outlet side of the filter. Although the strategy is effective, it decreases the overall amount of SCR catalyst that can be deposited on the filter and may limit the degree of NOx reduction possible.

The industry would benefit from the availability of catalytic materials having attributes for both SCR and soot oxidation. A valuable material would have high density to enable high washcoat loadings, high SCR activity coupled with high thermal durability, and low selectivity for $N_2O$ formation, particularly in the presence of $NO_2$. Ideally, the material would provide a desirable balance between $NO_2$ consumption in the SCR reaction and $NO_2$ availability for passive soot oxidation to facilitate the development of compact after-treatment systems for diesel exhaust.

As discussed earlier, improved SCR catalysts, particularly low-temperature $NH_3$-SCR catalysts, are also needed. Catalysts that can retain or even improve NOx conversion activity when exposed to elevated temperatures are needed. Ideally, the catalysts would use valuable oxide components (e.g., niobia or tantala) more efficiently.

SUMMARY OF THE INVENTION

Provided are niobia- and tantala-doped ceria catalysts, their use in selective catalytic reduction (SCR) processes, and a compact after-treatment system for exhaust gases are disclosed. In some aspects, the catalyst comprises at least 91 wt. % of ceria and 0.1 to 9 wt. % of niobia or tantala doped on the ceria. While conventional SCR catalysts can deactivate at higher temperatures, the doped cerias, particularly ones having as little as 1 or 2 wt. % of $Nb_2O_5$ or $Ta_2O_5$, are activated toward NOx conversion by calcination. The doped cerias are also valuable for SCRF® catalyzed filter applications, including an after-treatment system that comprises a diesel particulate filter having inlets and outlets, and a dual-function catalyst coated on the inlets, outlets, or both. Compared with conventional SCR catalysts, the niobia or tantala-doped cerias enable a higher level of $NO_2$ to be present. Because a single catalyst can be used for SCR and soot oxidation, designers can reduce the size, complexity, and cost of exhaust treatment systems.

Accordingly, in one aspect, the invention relates to a selective catalytic reduction (SCR) process. The process comprises selectively reducing a gaseous mixture comprising nitrogen oxides in the presence of a reductant and a catalyst. The catalyst comprises at least 91 wt. % of ceria and 0.1 to 9 wt. % of niobia or tantala doped on the ceria. The catalyst is calcined at a temperature within the range of 600° C. to 1000° C.

In another aspect, the catalysts are prepared by impregnating ceria with an aqueous solution comprising a water-soluble niobium or tantalum salt, followed by calcination of the impregnated ceria.

The invention also includes a compact after-treatment system for a diesel vehicle. The system comprises a diesel particulate filter having inlets and outlets, and a dual-function catalyst coated on the inlets, outlets, or both. The catalyst comprises at least 80 wt. % of ceria and 0.1 to 20 wt. % of niobia or tantala doped on the ceria. The catalyst is calcined at a temperature within the range of 600° C. to 1000° C.

We surprisingly found that niobia- and tantala-doped cerias, particularly ones having low levels of $Nb_2O_5$ or $Ta_2O_5$, are activated toward NOx conversion by calcination. The doped cerias are exceptionally useful for selective catalytic reduction, especially $NH_3$-SCR. Catalysts having as little as 1 or 2 wt. % of niobia or tantala on ceria, upon calcination at temperatures as high as 1000° C., demonstrate excellent NOx reduction performance over the 150° C. to 550° C. temperature range of interest for SCR. In contrast, conventional tungsten-based SCR catalysts deactivate at elevated temperature.

The catalysts are also valuable for catalyzed filter applications, such as SCRF® catalyzed filters. Compared with conventional SCR catalysts such as iron zeolites, the niobia or tantala-doped cerias enable a higher level of $NO_2$ to be present. Because a single catalyst can be used for SCR and soot oxidation, designers can reduce the size, complexity, and cost of exhaust treatment systems.

DETAILED DESCRIPTION OF THE INVENTION

Figure 1:
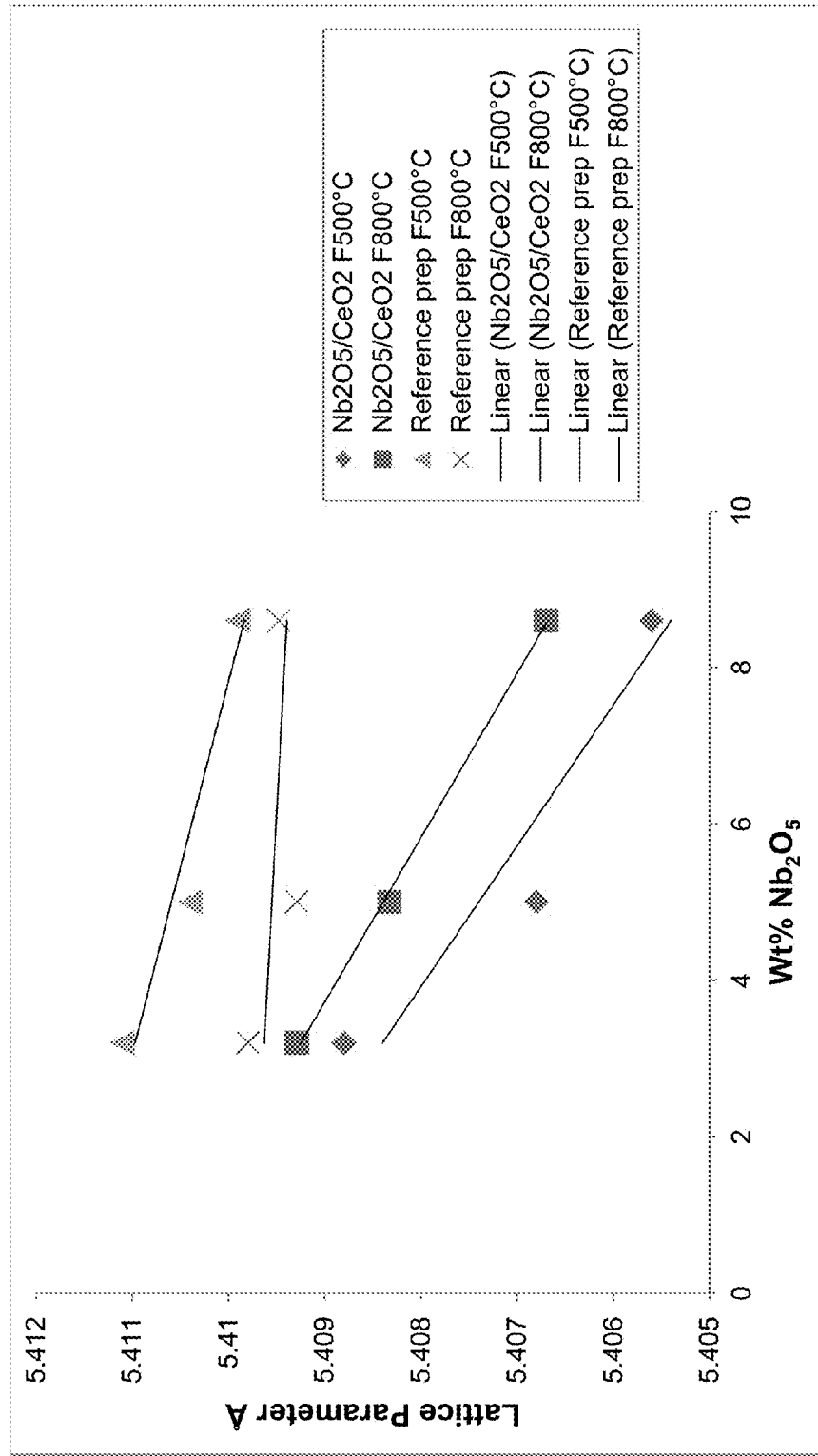
FIG. 1 plots lattice parameter versus wt. % $Nb_2O_5$ for niobia-doped cerias used in the inventive process and reference compositions made according to WO 2012/004263.

In one aspect, the invention relates to a process for selective catalytic reduction (SCR). In this process, a gaseous mixture comprising nitrogen oxides is selectively reduced in the presence of a reductant and a doped ceria catalyst. The nitrogen oxides (principally NO and $NO_2$) are reduced to $N_2$ while the reductant is oxidized. When ammonia is the reductant, $N_2$ is also an oxidation product. Ideally, the only reaction products are water and $N_2$, although some $NH_3$ is usually oxidized with air to NO or $N_2O$.

The SCR process is preferably performed at a temperature of at least 100° C., more preferably at temperatures within the range of 100° C. to 650° C., even more preferably 110° C. to 600° C., most preferably 150° C. to 550° C. The gaseous mixture comprising nitrogen oxides may contain one or more of NO, $NO_2$, and $N_2O$ in addition to other non-NOx gases such as $N_2$, $O_2$, CO, $CO_2$, and $H_2O$. Typically, the exhaust gas will contain from 1 to 10,000 ppm, more typically 10 to 1,000 ppm, even more typically 50 to 500 ppm of NO.

Catalysts useful for the SCR process comprise ceria doped with niobia ($Nb_2O_5$) or tantala ($Ta_2O_5$). In particular, the catalysts comprise at least 91 wt. % of ceria and 0.1 to 9 wt. % of niobia or tantala doped on the ceria. Preferably, the catalysts comprise 91 to 99.5 wt. % of ceria and 0.5 to 9 wt. % of niobia or tantala. More preferred are catalysts comprising 92 to 99 wt. % of ceria and 1 to 8 wt. % of niobia or tantala. Most preferred are catalysts comprising at least 95 wt. % of ceria, preferably 95 to 99 wt. % of ceria and 1 to 5 wt. % of niobia or tantala. Catalysts comprising niobia doped on ceria are particularly preferred.

Preferred cerias for use have high surface areas, particularly greater than 50 m²/g, more preferably greater than 100 m²/g. Suitable high-surface-area cerias are commercially available. Examples include HSA20 ceria from Rhodia, high-surface-area cerium oxides available from MolyCorp, HEFA Rare Earth, NanoOxides or other suppliers, and the like. Suitable high-surface-area cerias can also be synthesized, as taught, for instance, in U.S. Pat. Nos. 7,094,383; 5,063,193; 4,859,432; and 4,661,330, the teachings of which are incorporated herein by reference, as well as PCT Int. Appl. WO 2001/036332 and EP 0444470.

By "doped," we mean that that niobium or tantalum is integrated into the ceria lattice structure, typically as a mixed oxide (e.g., niobia and ceria or tantala and ceria). A doped ceria may be identified as having a reduced lattice parameter when compared with non-doped ceria, as the dopant (e.g., Nb or Ta) will usually have a smaller ionic radius when compared with cerium. The niobium or tantalum may be either uniformly distributed within the lattice or be in a higher concentration in a layer at or near the surface of the ceria lattice. Here, the ceria is either formed prior to introduction of the niobium or the ceria and niobia are generated essentially simultaneously, as in a co-precipitation process. For example, the niobium or tantalum is applied to ceria particles. Thus, "doped on the ceria" is distinct from physical mixtures of the oxide and excludes compositions in which the ceria is formed in the presence of a pre-made niobia or tantala particles. Such pre-formed compositions are described, e.g., in PCT Int. Appl. No. WO 2012/004263 at Examples 9 and 10. Thus, in certain embodiments, the catalyst is free or essentially free of a niobia or tantala physical coating on ceria and are free or essentially free of a ceria physical coating on niobia or tantala.

In preferred niobia- or tantala-doped cerias, the lattice parameter is reduced significantly compared with that of undoped ceria. Such lattice contraction may indicate that the niobia or tantala has become part of the lattice framework. Preferably, the lattice parameter of the niobia- or tantala-doped ceria is at least 0.02% less, more preferably at least 0.04% less, than that of undoped ceria. We surprisingly found that such lattice contraction can be observed even when the catalyst is calcined at relatively low temperature (e.g., 500° C.). As shown in FIG. 1, lattice contraction is evident with increasing levels of niobia when a niobia-doped ceria is prepared by the impregnation method described in Examples 1-3 below. In contrast, the same degree of lattice contraction is not observed when ceria is formed in the presence of niobia as described in WO 2012/004263 and replicated in Comparative Examples 4-6 below.

In one suitable synthetic approach, the doped ceria is made by impregnating ceria with an aqueous solution containing a soluble salt of niobium or tantalum, usually an acetate, nitrate, halide, oxalate, or the like such as niobium (V) chloride, niobium(III) nitrate, ammonium niobate(V) oxalate, or tantalum(V) chloride. If desired, enough water can be used to form a slurry. Alternatively, the amount of water might be minimized, as in an incipient wetness method. Wet mechanical mixing can also be used (see EP 2,368,628). In any event, the water is then usually removed by drying, and the product is calcined to give niobia- or tantala-doped ceria. For an example of the impregnation approach, see U.S. Publ. No. 2013/0121902, the teachings of which are incorporated herein by reference.

The doped ceria support can also be made by co-precipitation of ceria and niobia or tantala from aqueous media. In this case, an aqueous solution containing dissolved salts of cerium and niobium or tantalum is combined with aqueous ammonia, ammonium carbonate, or another basic compound. Hydrogen peroxide can be added to further encourage precipitation. The product is isolated, washed, dried, and calcined to give the niobia- or tantala-doped ceria. Because certain niobium sources hydrolyze more rapidly than the corresponding cerium compounds, co-precipitation may produce a support having pockets of niobia interspersed with ceria. For examples of the co-precipitation approach, see U.S. Pat. Nos. 6,605,264, the teachings of which are incorporated herein by reference, and EP 2,368,628.

The niobia- or tantala-doped ceria catalysts are calcined at a temperature within the range of 600° C. to 1000° C., preferably 700° C. to 950° C., more preferably 750° C. to 900° C. Calcination can be performed briefly (e.g., less than an hour), or it can be more prolonged (e.g., 24 hours). We surprisingly found that calcination activates the niobia- or tantala-doped cerias toward NOx reduction. Even catalysts that have only 1 or 2 wt. % of niobia or tantala show substantial activation when calcined at elevated temperature.

The catalysts are preferably calcined in air. If desired, however, they can be treated hydrothermally. That is, the catalyst can be aged in the presence of both heat and moisture. Typical conditions for hydrothermal aging might be, e.g., 500° C. to 900° C. in the presence of added steam.

In some niobia- or tantala-doped cerias, calcination (and/or hydrothermal aging) may encourage migration of a portion of the niobia or tantala to the catalyst surface. The degree of migration can be measured using x-ray photoelectron spectroscopy or other suitable techniques. In one aspect, the doped ceria catalyst has, at its surface, a molar ratio of niobium or tantalum to cerium that is at least doubled by the calcination. In another aspect, the doped ceria catalyst has, at its surface, a molar ratio of niobium or tantalum to cerium greater than 0.2, preferably greater than 0.3.

The degree to which niobia or tantala migrates to the surface of the catalyst can be expressed in terms of a distribution quotient, Q, which is given by:

$$Q = (E_{surface}/Ce_{surface})/(E_{bulk}/Ce_{bulk})$$

In this expression, $E_{surface}/Ce_{surface}$ is the molar ratio of niobium or tantalum to cerium measured at the surface of the catalyst by x-ray photoelectron spectroscopy, and $E_{bulk}/Ce_{bulk}$ is the molar ratio of niobium or tantalum to cerium in a bulk sample of the catalyst. For niobia and tantala-doped cerias useful herein, Q is preferably greater than 1.5 and more preferably has a value within the range of 2 to 10.

Additional support materials can be included, such as zeolites, clays, aluminas, silica-aluminas, zirconia, titania, or the like, provided that the support comprises at least 91 wt. % of ceria and 0.1 to 9 wt. % of niobia or tantala doped on the ceria. In certain embodiments, a catalyst or catalyst article of the present invention comprises an ammonia storage material, such as a zeolite. The ammonia storage material may be present with the ceria as a mixed oxide, as a coating on the ceria particles, as a component in a washcoat or extrudable paste containing the ceria, and/or as a discrete zone or layer adjacent or proximal to a zone or layer containing the ceria.

In certain embodiments, the support or catalyst as a whole is free or essentially free of zirconia. In certain embodiments, the support or catalyst as a whole is free or essentially free of alumina or silica-alumina. In certain embodiments, the support or catalyst as a whole is free or essentially free of titania. In certain embodiments, the support or catalyst as a whole is free or essentially free of zeolites. In certain embodiments, the support or catalyst as a whole is free or essentially free of clays. As used herein, the term "essentially free" of a component means that the support or catalyst contains less than 0.1 weight percent, or even less than 0.01 weight percent of the component.

The doped cerias are useful for SCR applications, particularly $NH_3$-SCR, and particularly SCR applications having high amounts of sulfur. In certain embodiments, the SCR catalyst is useful in treating exhaust gas generated by combustion of hydrocarbon based fuel having ≥10 ppm sulfur, for example ≥15 ppm, ≥50 ppm, ≥100 ppm, ≥500 ppm, ≥1000 ppm, or ≥5000 ppm sulfur and can treat such exhaust gas with fewer regenerations (e.g., at least 20% fewer, at least 35% fewer, or at least 50% fewer regenerations) compared to zeolite-, vanadia-, and/or undoped ceria-based SCR catalysts.

The catalyst comprises at least 80 wt. % of ceria and 0.1 to 20 wt. % of niobia or tantala doped on the ceria. The catalyst is calcined at a temperature within the range of 600° C. to 1000° C., preferably from 700° C. to 950° C. Under normal operating conditions for the vehicle, the catalyst preferably promotes selective catalytic reduction of gaseous mixtures comprising nitrogen oxides in the presence of a reductant while maintaining a nitrogen dioxide concentration adequate to allow the catalyst to passively oxidize soot.

In preferred after-treatment systems, a nitrogen compound, preferably ammonia, is used as the reductant. In preferred after-treatment systems, the catalyst comprises 1 to 15 wt. %, preferably 1 to 10 wt. %, more preferably 1 to 5 wt. %, of niobia or tantala.

Certain aspects of the invention provide a catalytic washcoat. The washcoat comprising the catalyst described herein is preferably a solution, suspension, or slurry. In addition to the catalyst, a washcoat can include non-catalytic components, such as fillers, binders, stabilizers, rheology modifiers, and other additives, including one or more of alumina, silica, non-zeolite silica alumina, titania, zirconia, ceria. In certain embodiments, the catalyst composition may comprise pore-forming agents such as graphite, cellulose, starch, polyacrylate, and polyethylene, and the like. These additional components do not necessarily catalyze the desired reaction, but instead improve the catalytic material's effectiveness, for example, by increasing its operating temperature range, increasing contact surface area of the catalyst, increasing adherence of the catalyst to a substrate, etc. In certain embodiments, the washcoat loading is >0.3 g/in$^3$, such as >1.2 g/in$^3$, >1.5 g/in$^3$, >1.7 g/in$^3$ or >2.00 g/in$^3$, and preferably <3.5 g/in$^3$, such as <2.5 g/in$^3$. In certain embodiments, the washcoat is applied to a substrate in a loading of about 0.8 to 1.0 g/in$^3$, 1.0 to 1.5 g/in$^3$, or 1.5 to 2.5 g/in$^3$.

Suitable washcoats include surface coatings, coatings that penetrate a portion of a substrate, coatings that permeate a substrate, or some combination thereof. Two of the most common substrate designs are plate and honeycomb. Preferred substrates, particularly for mobile applications, include flow-through monoliths having a so-called honeycomb geometry that comprise multiple adjacent, parallel channels that are open on both ends and generally extend from the inlet face to the outlet face of the substrate and result in a high-surface area-to-volume ratio. For certain applications, the honeycomb flow-through monolith preferably has a high cell density, for example about 600 to 800 cells per square inch, and/or an average internal wall thickness of about 0.18-0.35 mm, preferably about 0.20-0.25 mm. For certain other applications, the honeycomb flow-through monolith preferably has a low cell density of about 150-600 cells per square inch, more preferably about 200-400 cells per square inch. Preferably, the honeycomb monoliths are porous. In addition to cordierite, silicon carbide, silicon nitride, ceramic, and metal, other materials that can be used for the substrate include aluminum nitride, silicon nitride, aluminum titanate, α-alumina, mullite, e.g., acicular mullite, pollucite, a thermet such as $Al_2OsZFe$, $Al_2O_3/Ni$ or $B_4CZFe$, or composites comprising segments of any two or more thereof. Preferred materials include cordierite, silicon carbide, and alumina titanate.

Plate-type catalysts have lower pressure drops and are less susceptible to plugging and fouling than the honeycomb types, which is advantageous in high efficiency stationary applications, but plate configurations can be much larger and more expensive. A honeycomb configuration is typically smaller than a plate type, which is an advantage in mobile applications, but has higher pressure drops and plug more easily. In certain embodiments the plate substrate is constructed of metal, preferably corrugated metal.

The washcoat can be disposed on a flow-through honeycomb substrate in a zone, such as a front zone extending from the inlet end of the substrate to 5 to 60% of the length of the substrate, or a rear zone extending from the outlet end of the substrate to 5 to 60% of the length of the substrate.

The surface washcoat can be disposed on a wall-flow filter on the inlet side or the outlet size.

In certain embodiments, the invention is a catalyst article which comprises, in addition to the niobia- or tantala-doped ceria, a substrate. In a particular embodiment, the catalyst article is produced by a process that includes the steps of applying a catalyst composition, preferably as a washcoat, to a substrate as a layer either before or after at least one additional layer of another composition for treating exhaust gas has been applied to the substrate. The one or more catalyst layers on the substrate, including the catalyst layer, are arranged in consecutive layers. As used herein, the term "consecutive" with respect to catalyst layers on a substrate means that each layer is contact with its adjacent layer(s) and that the catalyst layers as a whole are arranged one on top of another on the substrate.

In certain embodiments, the catalyst is disposed on the substrate as a first layer and another composition, such as oxidation catalysts, other reduction catalysts (e.g., another SCR catalyst), scavenging components (e.g., for sulfur, water, etc.), or $NO_x$ storage components, is disposed on the substrate as a second layer. In other embodiments, the catalyst is disposed on the substrate as a second layer and another composition, such as the ones described above, is disposed on the substrate as a first layer. As used herein the terms "first layer" and "second layer" are used to describe the relative positions of catalyst layers in the catalyst article with respect to the normal direction of exhaust gas flow-through, past, and/or over the catalyst article. Under normal exhaust gas flow conditions, exhaust gas contacts the first layer prior to contacting the second layer. In certain embodiments, the second layer is applied to an inert substrate as a bottom layer and the first layer is top layer that is applied over the second layer as a consecutive series of sub-layers. In such embodiments, the exhaust gas penetrates (and hence contacts) the first layer, before contacting the second layer, and subsequently returns through the first layer to exit the catalyst component. In other embodiments, the first layer is a first zone disposed on an upstream portion of the substrate and the second layer is disposed on the substrate as a second zone, wherein the second zone is downstream of the first.

In another embodiment, the catalyst article is produced by a process that includes the steps of applying a catalyst composition, preferably as a washcoat, to a substrate as a first zone, and subsequently applying at least one additional composition for treating an exhaust gas to the substrate as a second zone, wherein at least a portion of the first zone is downstream of the second zone. Alternatively, the catalyst composition can be applied to the substrate in a second zone that is downstream of a first zone containing the additional composition. Examples of additional compositions include oxidation catalysts, reduction catalysts, scavenging components (e.g., for sulfur, water, etc.), or $NO_x$ storage components.

To reduce the amount of space required for an exhaust system, individual exhaust components in certain embodiments are designed to perform more than one function. For example, applying a catalyst to a wall-flow filter substrate instead of a flow-through substrate serves to reduce the overall size of an exhaust treatment system by allowing one substrate to serve two functions, namely catalytically treating undesirable components in the exhaust gas and mechanically removing soot from the exhaust gas. Accordingly, in certain embodiments, the substrate is a honeycomb wall-flow filter or partial filter. Wall-flow filters are similar to flow-through honeycomb substrates in that they contain a plurality of adjacent, parallel channels. However, the channels of flow-through honeycomb substrates are open at both ends, whereas the channels of wall-flow substrates have one end capped, wherein the capping occurs on opposite ends of adjacent channels in an alternating pattern. Capping alternating ends of channels prevents the gas entering the inlet face of the substrate from flowing straight through the channel and existing. Instead, the exhaust gas enters the front of the substrate and travels into about half of the channels where it is forced through the channel walls prior to entering the second half of the channels and exiting the back face of the substrate.

The substrate wall has a porosity and pore size that is gas permeable, but traps a major portion of the particulate matter, such as soot, from the gas as the gas passes through the wall. Preferred wall-flow substrates are high efficiency filters. Wall flow filters for use with the present invention preferably have an efficiency of least 70%, at least about 75%, at least about 80%, or at least about 90%. In certain embodiments, the efficiency will be from about 75 to about 99%, about 75 to about 90%, about 80 to about 90%, or about 85 to about 95%. Here, efficiency is relative to soot and other similarly sized particles and to particulate concentrations typically found in conventional diesel exhaust gas. For example, particulates in diesel exhaust can range in size from 0.05 microns to 2.5 microns. Thus, the efficiency can be based on this range or a sub-range, such as 0.1 to 0.25 microns, 0.25 to 1.25 microns, or 1.25 to 2.5 microns.

Porosity is a measure of the percentage of void space in a porous substrate and is related to backpressure in an exhaust system: generally, the lower the porosity, the higher the backpressure. Preferably, the porous substrate has a porosity of about 30 to about 80%, for example about 40 to about 75%, about 40 to about 65%, or from about 50 to about 60%.

The pore interconnectivity, measured as a percentage of the substrate's total void volume, is the degree to which pores, void, and/or channels, are joined to form continuous paths through a porous substrate, i.e., from the inlet face to the outlet face. In contrast to pore interconnectivity is the sum of closed pore volume and the volume of pores that have a conduit to only one of the surfaces of the substrate. Preferably, the porous substrate has a pore interconnectivity volume of at least about 30%, more preferably at least about 40%.

The mean pore size of the porous substrate is also important for filtration. Mean pore size can be determined by any acceptable means, including by mercury porosimetry. The mean pore size of the porous substrate should be of a high enough value to promote low backpressure, while providing an adequate efficiency by either the substrate per se, by promotion of a soot cake layer on the surface of the substrate, or combination of both. Preferred porous substrates have a mean pore size of about 10 to about 40 μm, for example about 20 to about 30 μm, about 10 to about 25 μm, about 10 to about 20 μm, about 20 to about 25 μm, about 10 to about 15 μm, and about 15 to about 20 μm.

An advantage of using the niobia-doped cerias is the ability to coat inlet and outlet channels of a diesel particulate filter (DPF) without the usual concerns about oxidizing too much of the available $NO_2$, especially at the filter inlets. Because the niobia-doped cerias help to alleviate soot build-up through passive oxidation, it should be possible to prolong the time interval between burn cycles for the DPF, which will conserve fuel. The niobia-doped cerias may also help to reduce the temperature needed for soot oxidation.

Moreover, the ability to use the SCR catalyst for soot oxidation may, in some cases, overcome the need to include a diesel oxidation catalyst.

In general, the production of an extruded solid body containing the catalyst involves blending the catalyst, a binder, an optional organic viscosity-enhancing compound into a homogeneous paste which is then added to a binder/matrix component or a precursor thereof and optionally one or more of stabilized ceria, and inorganic fibers. The blend is compacted in a mixing or kneading apparatus or an extruder. The mixtures have organic additives such as binders, pore formers, plasticizers, surfactants, lubricants, dispersants as processing aids to enhance wetting and therefore produce a uniform batch. The resulting plastic material is then molded, in particular using an extrusion press or an extruder including an extrusion die, and the resulting moldings are dried and calcined. The organic additives are "burnt out" during calcinations of the extruded solid body. A separate catalyst may also be washcoated or otherwise applied to the extruded solid body as one or more sub-layers that reside on the surface or penetrate wholly or partly into the extruded solid catalytic body.

Extruded solid bodies containing catalysts according to the present invention generally comprise a unitary structure in the form of a honeycomb having uniform-sized and parallel channels extending from a first end to a second end thereof. Channel walls defining the channels are porous. Typically, an external "skin" surrounds a plurality of the channels of the extruded solid body. The extruded solid body can be formed from any desired cross section, such as circular, square or oval. Individual channels in the plurality of channels can be square, triangular, hexagonal, circular etc. Channels at a first, upstream end can be blocked, e.g. with a suitable ceramic cement, and channels not blocked at the first, upstream end can also be blocked at a second, downstream end to form a wall-flow filter. Typically, the arrangement of the blocked channels at the first, upstream end resembles a checker-board with a similar arrangement of blocked and open downstream channel ends.

The binder/matrix component is preferably selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof. The paste can optionally contain reinforcing inorganic fibers selected from the group consisting of carbon fibers, glass fibers, metal fibers, boron fibers, alumina fibers, silica fibers, silica-alumina fibers, silicon carbide fibers, potassium titanate fibers, aluminum borate fibers and ceramic fibers.

The alumina binder/matrix component is preferably gamma alumina, but can be any other transition alumina, i.e., alpha alumina, beta alumina, chi alumina, eta alumina, rho alumina, kappa alumina, theta alumina, delta alumina, lanthanum beta alumina and mixtures of any two or more such transition aluminas. It is preferred that the alumina is doped with at least one non-aluminum element to increase the thermal stability of the alumina. Suitable alumina dopants include silicon, zirconium, barium, lanthanides and mixtures of any two or more thereof. Suitable lanthanide dopants include La, Ce, Nd, Pr, Gd and mixtures of any two or more thereof.

Sources of silica can include a silica sol, quartz, fused or amorphous silica, sodium silicate, an amorphous aluminosilicate, an alkoxysilane, a silicone resin binder such as methylphenyl silicone resin, a clay, talc or a mixture of any two or more thereof. Of this list, the silica can be $SiO_2$ as such, feldspar, mullite, silica-alumina, silica-magnesia, silica-zirconia, silica-thoria, silica-berylia, silica-titania, ternary silica-alumina-zirconia, ternary silica-alumina-magnesia, ternary-silica-magnesia-zirconia, ternary silica-alumina-thoria and mixtures of any two or more thereof.

Preferably, the catalyst is dispersed throughout, and preferably evenly throughout, the entire extruded catalyst body, preferably a wall-flow filter. In certain embodiments, the doped ceria catalyst is present throughout the entire extruded catalyst body and at least a portion of the catalyst body (e.g. a front zone, rear zone, inlet layer, or outlet layer) is further impregnated with a platinum group metal. In such embodiments, the catalyst article can serve as an ammonia slip catalyst having low backpressure.

Where any of the above extruded solid bodies are made into a wall-flow filter, the porosity of the wall-flow filter can be from 30-80%, such as from 40-70%. Porosity and pore volume and pore radius can be measured e.g. using mercury intrusion porosimetry.

The catalyst described herein can promote the reaction of a reductant, preferably ammonia, with nitrogen oxides to selectively form elemental nitrogen ($N_2$) and water ($H_2O$). Thus, in one embodiment, the catalyst can be formulated to favor the reduction of nitrogen oxides with a reductant (i.e., an SCR catalyst). Examples of such reductants include hydrocarbons (e.g., C3-C6 hydrocarbons) and nitrogenous reductants such as ammonia and ammonia hydrazine or any suitable ammonia precursor, such as urea (($NH_2$)$_2$CO), ammonium carbonate, ammonium carbamate, ammonium hydrogen carbonate or ammonium formate.

The catalyst described herein can also promote the oxidation of ammonia. Thus, in another embodiment, the doped ceria catalyst can be formulated to favor the oxidation of ammonia with oxygen, particularly a concentrations of ammonia typically encountered downstream of an SCR catalyst (e.g., ammonia oxidation (AMOX) catalyst, such as an ammonia slip catalyst (ASC)). In certain embodiments, the doped ceria catalyst is disposed as a top layer over an oxidative under-layer, wherein the under-layer comprises a platinum group metal (PGM) catalyst or a non-PGM catalyst. Preferably, the catalyst component in the underlayer is disposed on a high surface area support, including but not limited to alumina.

In yet another embodiment, an SCR and AMOX operations are performed in series, wherein both processes utilize a catalyst comprising the catalyst described herein, and wherein the SCR process occurs upstream of the AMOX process. For example, an SCR formulation of the catalyst can be disposed on the inlet side of a filter and an AMOX formulation of the catalyst can be disposed on the outlet side of the filter.

Accordingly, provided is a method for the reduction of $NO_x$ compounds or oxidation of $NH_3$ in a gas, which comprises contacting the gas with a catalyst composition described herein for the catalytic reduction of $NO_x$ compounds for a time sufficient to reduce the level of $NO_x$ compounds and/or $NH_3$ in the gas. In certain embodiments, provided is a catalyst article having an ammonia slip catalyst disposed downstream of a selective catalytic reduction (SCR) catalyst. In such embodiments, the ammonia slip catalyst oxidizes at least a portion of any nitrogenous reductant that is not consumed by the selective catalytic reduction process. For example, in certain embodiments, the ammonia slip catalyst is disposed on the outlet side of a wall flow filter and an SCR catalyst is disposed on the upstream side of a filter. In certain other embodiments, the ammonia slip catalyst is disposed on the downstream end of a flow-through substrate and an SCR catalyst is disposed on the upstream end of the flow-through substrate. In other embodiments, the ammonia slip catalyst and SCR catalyst are disposed on separate bricks within the exhaust system. These separate bricks can be adjacent to, and in contact with, each other or separated by a specific distance, provided that they are in fluid communication with each other and provided that the SCR catalyst brick is disposed upstream of the ammonia slip catalyst brick.

In certain embodiments, the SCR and/or AMOX process is performed at a temperature of at least 100° C. In another embodiment, the process(es) occur at a temperature from about 150° C. to about 750° C. In a particular embodiment, the temperature range is from about 175 to about 550° C. In another embodiment, the temperature range is from 175 to 400° C. In yet another embodiment, the temperature range is 450 to 900° C., preferably 500 to 750° C., 500 to 650° C., 450 to 550° C., or 650 to 850° C. Embodiments utilizing temperatures greater than 450° C. are particularly useful for treating exhaust gases from a heavy and light duty diesel engine that is equipped with an exhaust system comprising (optionally catalyzed) diesel particulate filters which are regenerated actively, e.g. by injecting hydrocarbon into the exhaust system upstream of the filter, wherein the zeolite catalyst for use in the present invention is located downstream of the filter.

According to another aspect of the invention, provided is a method for the reduction of $NO_x$ compounds and/or oxidation of $NH_3$ in a gas, which comprises contacting the gas with a catalyst described herein for a time sufficient to reduce the level of $NO_x$ compounds in the gas. Methods of the present invention may comprise one or more of the following steps: (a) accumulating and/or combusting soot that is in contact with the inlet of a catalytic filter; (b) introducing a nitrogenous reducing agent into the exhaust gas stream prior to contacting the catalytic filter, preferably with no intervening catalytic steps involving the treatment of $NO_x$ and the reductant; (c) generating $NH_3$ over a $NO_x$ adsorber catalyst or lean $NO_x$ trap, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, may be used to oxidize particulate matter in particulate filter; and/or reduce the particulate matter (PM) in the exhaust gas; (e) contacting the exhaust gas with one or more flow-through SCR catalyst device(s) in the presence of a reducing agent to reduce the NOx concentration in the exhaust gas; and (f) contacting the exhaust gas with an ammonia slip catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

In another embodiment, all or at least a portion of the nitrogen-based reductant, particularly $NH_3$, for consumption in the SCR process can be supplied by a $NO_x$ adsorber catalyst (NAC), a lean $NO_x$ trap (LNT), or a $NO_x$ storage/reduction catalyst (NSRC), disposed upstream of the SCR catalyst, e.g., a SCR catalyst of the present invention disposed on a wall-flow filter. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 g/ft$^3$, such as 20 to 60 g/ft$^3$. Alternatively, the precious metal of the catalyst is characterized by the average concentration which may be from about 40 to about 100 grams/ft$^3$.

Under certain conditions, during the periodically rich regeneration events, $NH_3$ may be generated over a $NO_x$ adsorber catalyst. The SCR catalyst downstream of the $NO_x$ adsorber catalyst may improve the overall system $NO_x$ reduction efficiency. In the combined system, the SCR catalyst is capable of storing the released $NH_3$ from the NAC catalyst during rich regeneration events and utilizes the stored $NH_3$ to selectively reduce some or all of the $NO_x$ that slips through the NAC catalyst during the normal lean operation conditions.

The method for treating exhaust gas as described herein can be performed on an exhaust gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. In a particular embodiment, the method is used for treating exhaust gas from a vehicular lean burn internal combustion engine, such as a diesel engine, a lean-burn gasoline engine or an engine powered by liquid petroleum gas or natural gas.

In certain aspects, the invention is a system for treating exhaust gas generated by combustion process, such as from an internal combustion engine (whether mobile or stationary), a gas turbine, coal or oil fired power plants, and the like. Such systems include a catalytic article comprising the catalyst described herein and at least one additional component for treating the exhaust gas, wherein the catalytic article and at least one additional component are designed to function as a coherent unit.

In certain embodiments, the system comprises a catalytic article comprising a catalyst described herein, a conduit for directing a flowing exhaust gas, a source of nitrogenous reductant disposed upstream of the catalytic article. The system can include a controller for the metering the nitrogenous reductant into the flowing exhaust gas only when it is determined that the zeolite catalyst is capable of catalyzing $NO_x$ reduction at or above a desired efficiency, such as at above 100° C., above 150° C. or above 175° C. The metering of the nitrogenous reductant can be arranged such that 60% to 200% of theoretical ammonia is present in exhaust gas entering the SCR catalyst calculated at 1:1 $NH_3$/NO and 4:3 $NH_3/NO_2$.

In another embodiment, the system comprises an oxidation catalyst (e.g., a diesel oxidation catalyst (DOC)) for oxidizing nitrogen monoxide in the exhaust gas to nitrogen dioxide can be located upstream of a point of metering the nitrogenous reductant into the exhaust gas. In one embodiment, the oxidation catalyst is adapted to yield a gas stream entering the SCR zeolite catalyst having a ratio of NO to $NO_2$ of from about 4:1 to about 1:3 by volume, e.g. at an exhaust gas temperature at oxidation catalyst inlet of 250° C. to 450° C. The oxidation catalyst can include at least one platinum group metal (or some combination of these), such as platinum, palladium, or rhodium, coated on a flow-through monolith substrate. In one embodiment, the at least one platinum group metal is platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

In a further embodiment, a suitable filter substrate is located between the oxidation catalyst and the SCR catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the zeolite catalyst. Alternatively, if the filter is un-catalyzed, the means for metering nitrogenous reductant can be located between the oxidation catalyst and the filter.

In another aspect, the invention relates to a catalyst prepared by impregnating ceria with an aqueous solution comprising a water-soluble niobium or tantalum salt. The impregnated ceria is calcined at a temperature within the range of 600° C. to 1000° C., preferably 700° C. to 950° C., more preferably 750° C. to 900° C. The catalyst comprises at least 91 wt. % of ceria and 0.1 to 9 wt. % of niobia or tantala doped on the ceria. Preferably, the catalysts comprise 91 to 99.5 wt. % of ceria and 0.5 to 9 wt. % of niobia or tantala. More preferred are catalysts comprising 92 to 99 wt. % of ceria and 1 to 8 wt. % of niobia or tantala. Most preferred are catalysts comprising at least 95 wt. % of ceria, preferably 95 to 99 wt. % of ceria and 1 to 5 wt. % of niobia or tantala. Catalysts comprising niobia doped on ceria are particularly preferred.

The water soluble niobium or tantalum salt is typically an acetate, nitrate, halide, oxalate, or the like such as niobium (V) chloride, niobium(III) nitrate, ammonium niobate(V) oxalate, or tantalum(V) chloride. If desired, enough water can be used to form a slurry. Alternatively, the amount of water might be minimized, as in an incipient wetness method. Wet mechanical mixing can also be used. In any event, the water is then usually removed by drying, and the product is calcined to give niobia- or tantala-doped ceria.

The following examples merely illustrate the invention; the skilled person will recognize many variations that are within the spirit of the invention and scope of the claims.

EXAMPLE 1

Preparation of Niobia-Doped Ceria (3.2 wt. % $Nb_2O_5$)

Ammonium niobate(V) oxalate (21% Nb, 1.06 g, 2.4 mmol Nb, equivalent to 0.32 g $Nb_2O_5$) is dissolved in water (6 mL) with stirring and gentle warming. High-surface-area ceria (9.68 g) is added, and the mixture is stirred. The pore volume of the ceria is slightly exceeded so the sample is stirred/warmed to dryness on a hotplate. The sample is further dried in an oven at 105° C. Portions of the sample are calcined ("fired") at 500° C. for 2 h or at 800° C. for 4 h (10° C./min ramp rate).

EXAMPLE 2

Preparation of Niobia-Doped Ceria (5.0 wt. % $Nb_2O_5$)

The procedure of Example 1 is generally followed using ammonium niobate(V) oxalate (3.33 g, 7.52 mmol Nb, equivalent to 1.0 g of $Nb_2O_5$), ceria (19 g), and water (12 mL).

EXAMPLE 3

Preparation of Niobia-Doped Ceria (8.6 wt. % $Nb_2O_5$)

The procedure of Example 1 is generally followed using ammonium niobate(V) oxalate (2.86 g, 6.47 mmol Nb, equivalent to 0.86 g of $Nb_2O_5$), ceria (9.14 g), and water (6 mL).

In Comparative Examples 4-6, the procedure of PCT Int. Publ. No. WO 2012/004263 (Rhodia) is generally followed to produce catalysts in which ceria is formed in the presence of niobia. Based on the preparation method, the catalysts should have a core of niobia surrounded by a ceria shell.

COMPARATIVE EXAMPLE 4

1. Preparation of a niobia sol: Ethanol (100 mL) is dried for 20 h over 3A molecular sieves (18 g). The sieves are pre-fired at 400° C. for 1 h to remove water. A round-bottom flask is charged with anhydrous ethanol (40 mL) and a small magnetic stir bar. The ethanol is stirred, and niobium(V) chloride (10 g, 0.037 mol) is added using a plastic spatula. When the addition is complete, a pale yellow solution results. More ethanol (21 mL) is added, stirring is discontinued, and the flask is stoppered and allowed to stand for 2 h. The stopper is replaced with a reflux condenser, and the solution is heated to about 70° C. for 1 h. After heating, the solution loses color, and it is allowed to stand overnight at room temperature.

Concentrated (35%) ammonia (25.1 g) is magnetically stirred in a beaker. The niobium(V) chloride/ethanol solution prepared above is poured into the stirred ammonia simultaneously with water (76 mL). A white precipitate occurs immediately, and the mixture exotherms. After stirring for 0.5 h, the mixture is filtered, and the solids are washed with water until the thermal conductivity of the filtrate is about 1 mS. The mixture is slow to filter and wash.

The precipitate is stirred in nitric acid (81 mL of 1 M aq. $HNO_3$) for 4 days. A white suspension of $Nb_2O_5$ is obtained (pH: 0.55; yield of suspension: 122.6 g). Assuming no losses, the niobia sol contains 0.037 mol Nb (0.0001508 mol $Nb_2$/g).

2. Preparation of Ceria-Encapsulated Niobia.

A beaker is charged with water (50 mL), a magnetic stir bar, and a pH probe. The pH is adjusted to about 9.0 with a couple of drops of ammonia solution (prepared by diluting 24 mL of concentrated (35%) ammonia to 100 mL).

Separately, cerium(III) nitrate hexahydrate (24.4 g, 0.0562 mol, equivalent to 9.68 g $CeO_2$) is dissolved in water (180 mL). A portion of the niobia sol (7.95 g, equivalent to 0.32 g $Nb_2O_5$, 0.0012 mol $Nb_2$) is added, followed by 30% hydrogen peroxide (6.37 g, 0.0562 mol). Upon addition of the peroxide, the suspension turns yellow.

The suspension is pumped (16 mL/min) into the well-stirred ammonia solution prepared earlier, and additional ammonia solution is added dropwise by hand to maintain the pH at about 9.0. When the addition is complete, the mixture is stirred for 0.5 h and is then filtered. The resulting yellow/orange precipitate is washed with water (3×500 mL) and then dried (105° C.) to give a solid product (10.4 g). Portions of the sample are calcined at 500° C. for 2 h or at 800° C. for 4 h (10° C./min ramp rate). The finished product contains 3.2 wt. % $Nb_2O_5$.

COMPARATIVE EXAMPLE 5

The procedure of Comparative Example 4 is generally followed using niobia sol (12.47 g, equivalent to 0.5 g $Nb_2O_5$, 0.00188 mol $Nb_2$), cerium(III) nitrate hexahydrate (23.97 g, 0.0552 mol, equivalent to 9.5 g $CeO_2$), the ammonia solution, and 30% hydrogen peroxide (6.26 g, 0.0552 mol). Yield: 10.47 g. Portions of the sample are calcined at 500° C. for 2 h or at 800° C. for 4 h (10° C./min ramp rate). The finished product contains 5.0 wt. % $Nb_2O_5$.

COMPARATIVE EXAMPLE 6

The procedure of Comparative Example 4 is generally followed using niobia sol (21.44 g, equivalent to 0.86 g $Nb_2O_5$, 0.00324 mol $Nb_2$), cerium(III) nitrate hexahydrate (23.06 g, 0.0531 mol, equivalent to 9.14 g $CeO_2$), the ammonia solution, and 30% hydrogen peroxide (6.02 g, 0.0531 mol). Yield: 10.34 g. Portions of the sample are calcined at 500° C. for 2 h or at 800° C. for 4 h (10° C./min ramp rate). The finished product contains 8.6 wt. % $Nb_2O_5$.

Preparation of Niobia-Doped Ceria Catalysts: General Procedure

The procedure of Example 1 is generally used to prepare additional niobia-doped ceria catalysts that contain 1.0, 2.0, 5.0, 8.0, or 10.0 wt. % of niobia. These catalysts are calcined at 500° C., 700° C., 750° C., 800° C., or 900° C. In some cases, the catalysts are subjected to lean hydrothermal aging (LHA). This is accomplished by subjecting catalyst powders to an atmosphere of 10% steam in air, heating the samples to 700° C. (ramp rate: 10° C./min), holding the samples at 700° C. for 25 h, and cooling to room temperature. After preparation, the catalysts are tested in the ammonia-SCR process described below. Results appear in FIGS. 3-12.

Preparation of Tantala-Doped Ceria Catalyst

A tantala-doped ceria catalyst that contains 8.85 wt. % of $Ta_2O_5$ is prepared as follows:

1. Tantalum Oxalate. Tantalum(V) chloride (5.0 g, 0.0167 mol) is dissolved in concentrated HCl (30 mL, 0.36 mol) with gentle stirring. The solids take about 2 h to dissolve completely. The solution is allowed to stand overnight and is then diluted with water to about 50 mL. The acidic $TaCl_5$ solution is added rapidly to a vigorously stirred ammonia solution (30 mL of concentrated $NH_4OH$ diluted to 1.5 L with water). After stirring for 20 min, the resulting gelatinous white precipitate is recovered by filtration and washed until the conductivity of the filtrate is less than 35 µS. Oxalic acid dehydrate (5.26 g, 0.0418 mol) is dissolved in water (17 mL) with stirring and heating at 60-70° C. (Oxalic acid precipitates if the mixture is allowed to cool.) While the solution is at 60-70° C., the tantalum oxide/hydroxide gel is added in portions, and the mixture is digested to give an opaque mixture (about 50 mL). Assuming no losses, the product contains 0.0167 mol tantalum oxalate (0.334 M Ta oxalate, 60.4 g/L Ta).

2. Tantala-doped Ceria. High-surface-area ceria (19.0 g) is impregnated with a portion of the tantalum oxide mixture prepared above (25 mL, 0.0083 mol). The pore volume is exceeded, so the mixture is dried on a hot plate, then oven dried at 105° C. The sample is then calcined at 500° C. for 2 h (ramped 10° C./min). In some cases, the catalyst is calcined at 750° C. After preparation, the catalyst (8.85% $Ta_2O_5/CeO_2$) is tested in the ammonia-SCR process described below. Results appear in FIG. 4.

Preparation of Comparative Catalsts: Tungsten on CeO or $CeZrO_4$

Comparative catalysts with tungsten (10 wt. %) supported on ceria or a mixed oxide of ceria and zirconia ("$CeZrO_4$") are prepared as follows.

1. 10% Tungsten on Ceria

Ammonium metatungstate (5.33 g) is dissolved in deionized water (20 mL), and the solution is combined with ceria (40 g). The mixture is dried at 105° C. overnight and calcined at 500° C. for 2 h.

2. 10% Tungsten on $CeZrO_4$

Ammonium metatungstate (4.5 g) is dissolved in deionized water (9 mL), and the solution is used to impregnate a $CeZrO_4$ support (30 g). The mixture is dried at 105° C. overnight and calcined at 500° C. for 2 h.

After preparation, pelletized samples of the catalysts (0.4 g) are tested in the ammonia-SCR process in the SCAT reactor under the conditions described below. Results appear in FIGS. 3 and 7-11.

Determination of Lattice Parameter

A Bruker AXS D8 Advance™ X-ray diffractometer with a 90 position sample changer is used. Lattice parameter (in Angstroms) is measured by Reitveld analysis (L Vol-IB method) using a complete-powder, diffraction-pattern fitting technique.

$NH_3$-SCR Activity Test Conditions

Powder samples of catalysts are obtained by pelletizing the original samples, crushing the pellets, and then passing the resulting powder through a 255-350 µm sieve. The sieved powders are loaded into a synthetic catalyst activity test (SCAT) reactor and tested using the following synthetic diesel exhaust gas mixture (at inlet) including ammonia as the reductant: 500 ppm NO, 500 ppm $NH_3$, 9% $O_2$, 5% $CO_2$, 5% $H_2O$, 300 ppm CO, balance $N_2$ at a space velocity of 30,000 $h^{-1}$.

Samples are heated gradually from 150° C. to 550° C. at 5° C./min, and the composition of the off-gases is analyzed using FTIR spectroscopy to determine the % conversion of NOx gases.

Results

Lattice parameter for each of the catalysts prepared in Examples 1-3 and Comparative Examples 4-6 is determined as described above. FIG. 1 shows that niobia-doped cerias useful for the SCR processes of the invention (prepared in Examples 1-3) undergo substantial lattice contraction with increasing levels of niobia. This is evidenced by the large negative slope in the best-fit line. The results suggest that these materials incorporate niobium into the lattice framework. In contrast, when the procedure of WO 2012/004263 is used to prepare catalysts having the same $Nb_2O_5$ content (Comparative Examples 4-6), little or no lattice contraction is evident. This demonstrates that the preparation procedure of the '263 publication gives a different catalyst from the ones prepared in Examples 1-3, even if the $Nb_2O_5$ content is the same. The result is sensible because the procedure of the '263 publication first prepares niobia, then forms ceria in the presence of the niobia. In contrast, niobia is doped to pre-formed ceria in Examples 1-3.

Figure 2:
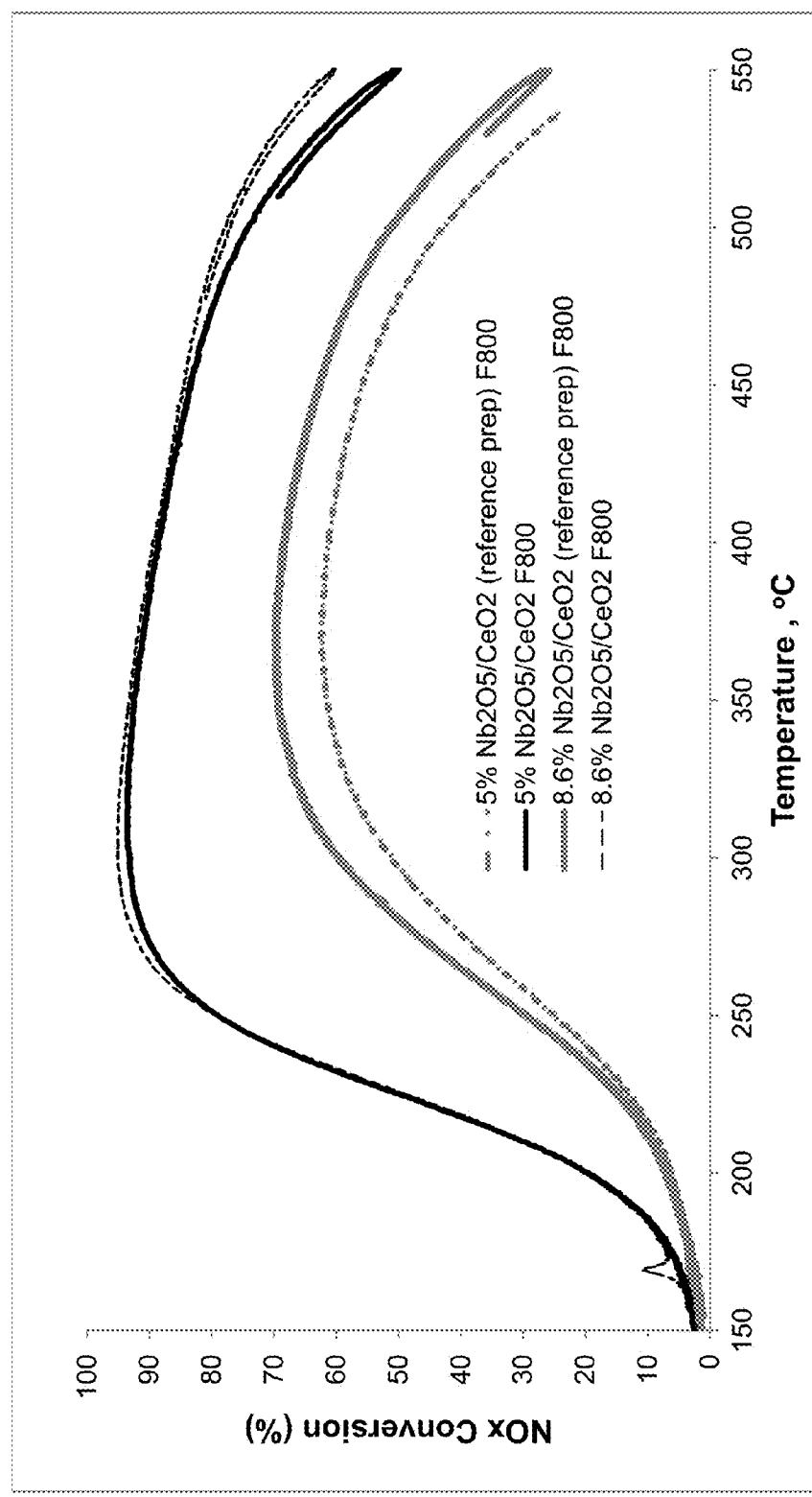
FIG. 2 shows NOx conversion versus temperature for niobia-doped cerias used in the inventive process and reference compositions made according to WO 2012/004263.

Further evidence that the catalysts of Examples 1-3 differ from those of Comparative Examples 4-6 appears in FIG. 2. FIG. 2 plots NOx conversion versus temperature for niobia-doped cerias used in the inventive process and for the reference compositions made according to WO 2012/004263. As shown in the figure, the inventive niobia-doped ceria catalysts convert a much higher percentage of NOx at temperatures in the range of 150° C. to 550° C. when the niobia content is 5.0 wt. % or 8.6 wt. %.

Figure 3:
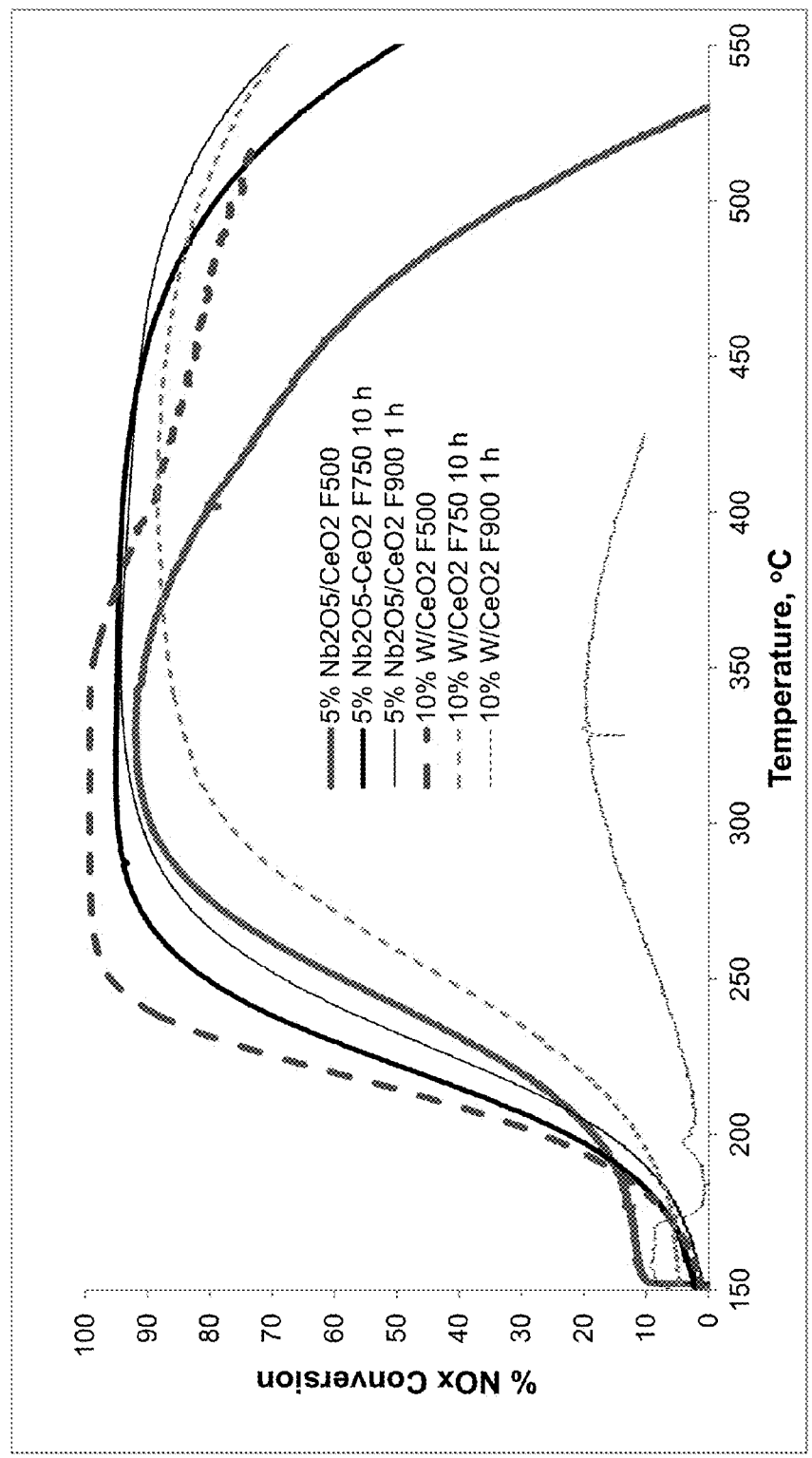
FIG. 3 provides NOx conversion versus temperature for 5% niobia-doped ceria and a comparative tungsten catalyst and shows the effect of calcination temperature.

FIG. 3. plots NOx conversion against temperature for 5% niobia-doped ceria and a comparative tungsten-on-ceria catalyst. As shown in the figure, the tungsten catalyst has reduced activity after calcining at 750° C. and is almost completely deactivated by calcining at 900° C. In contrast, the niobia-doped ceria is activated by calcining at 750° C., and it retains high activity even when calcined at 900° C.

Figure 4:
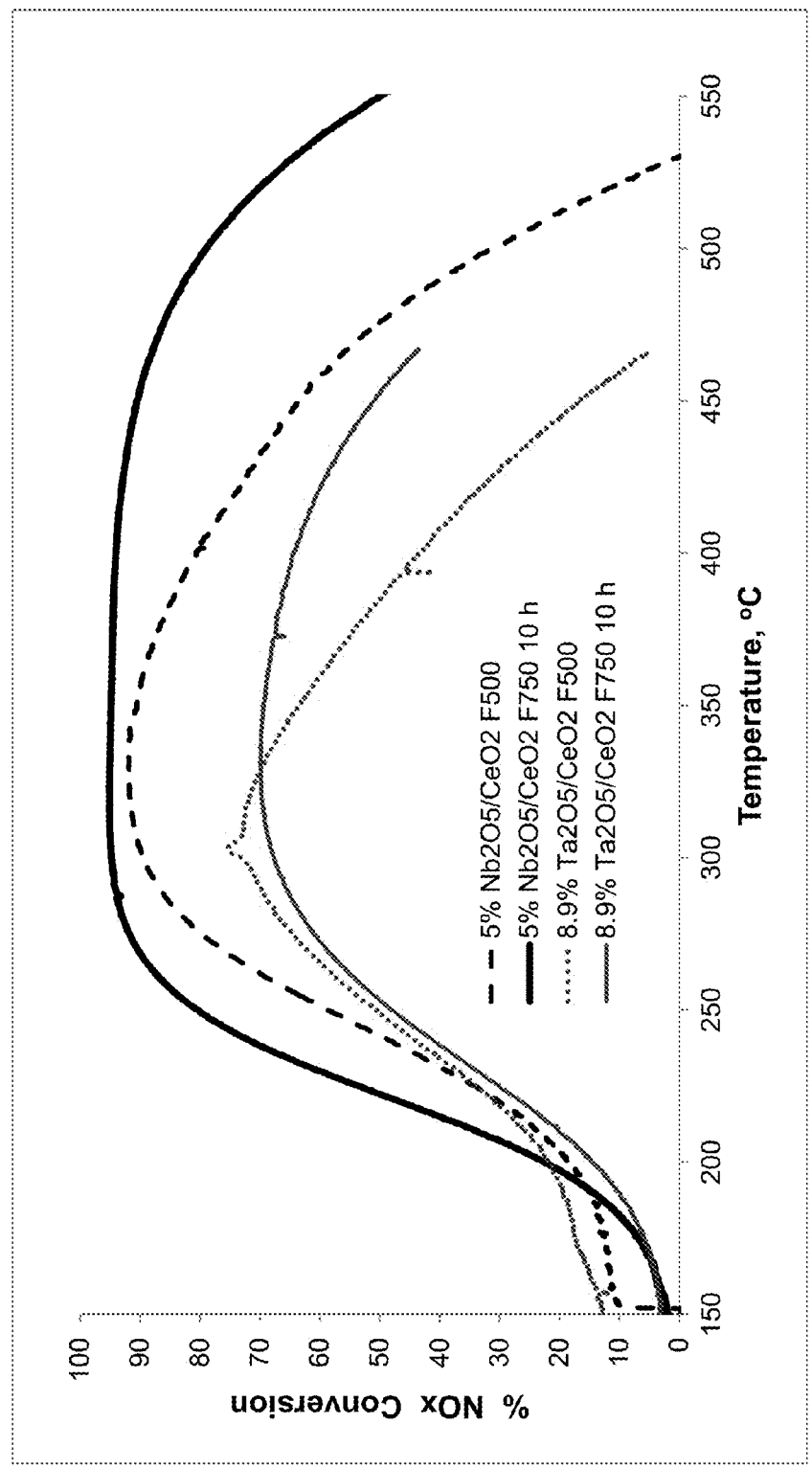
FIG. 4 compares NOx conversion versus temperature results for 5% niobia-doped ceria and 8.9% tantala-doped ceria and shows the activating effect of calcination.
Figure 5:
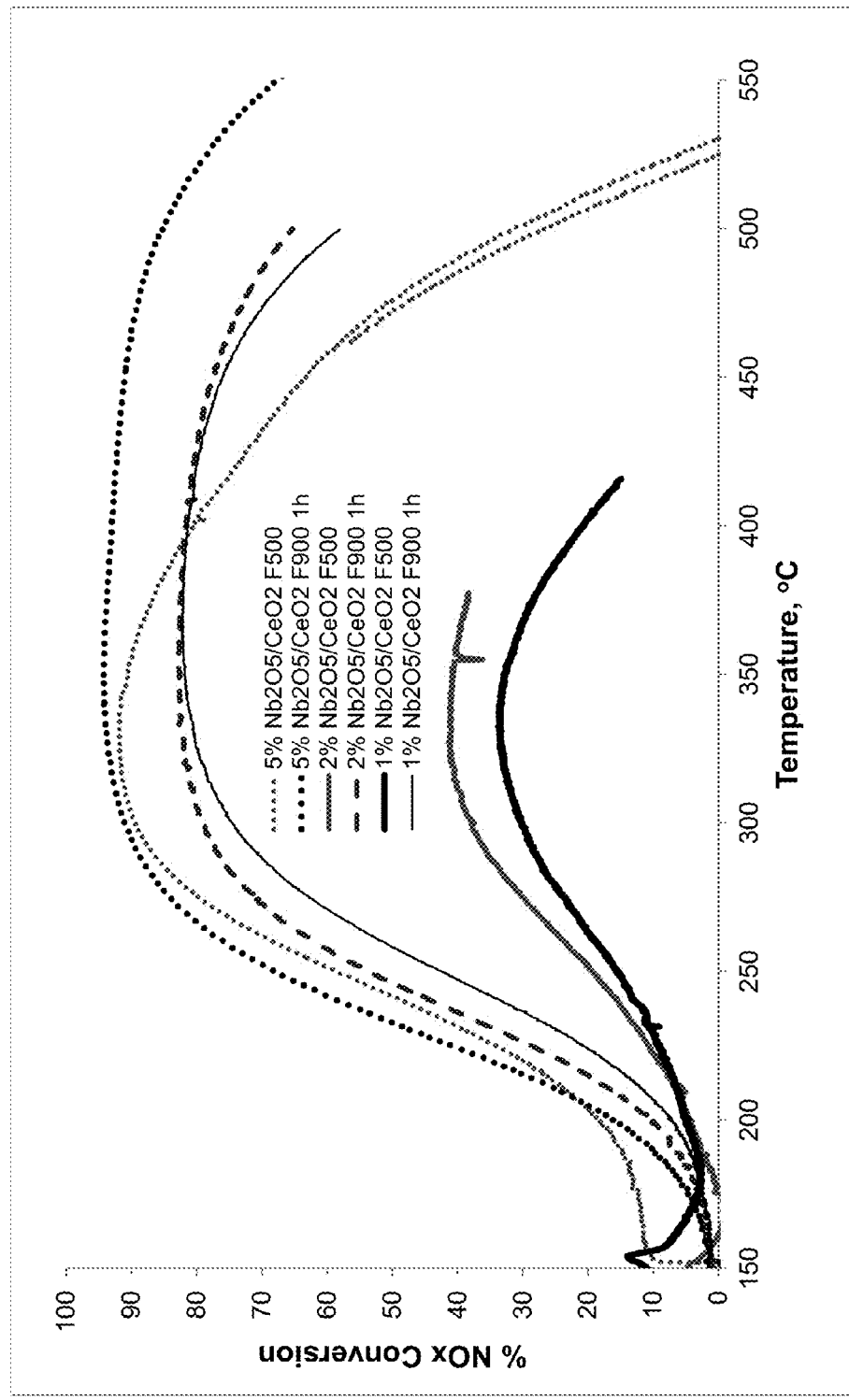
FIG. 5 further illustrates the benefits for NOx conversion of calcining, at elevated temperature, doped cerias having 1 to 5 wt. % of niobia.

Tantala-doped cerias display a similar activating trend when calcined at elevated temperature, although the effect may be somewhat less than is seen with niobia. As shown in FIG. 4, NOx conversion is higher for the 5% niobia-doped ceria compared with the 8.9% tantala-doped ceria. However, both catalysts are activated by calcination at 750° C.

Prior to activation by calcination, niobia-doped cerias may have relatively low activity for NOx conversion, especially when the niobia level is only 1-2 wt. %. However, as demonstrated in FIG. 5, calcining at 900° C. for 1 h dramatically improves the NOx conversion activity of niobia-doped catalysts having 1-5 wt. % niobia.

Figure 6:
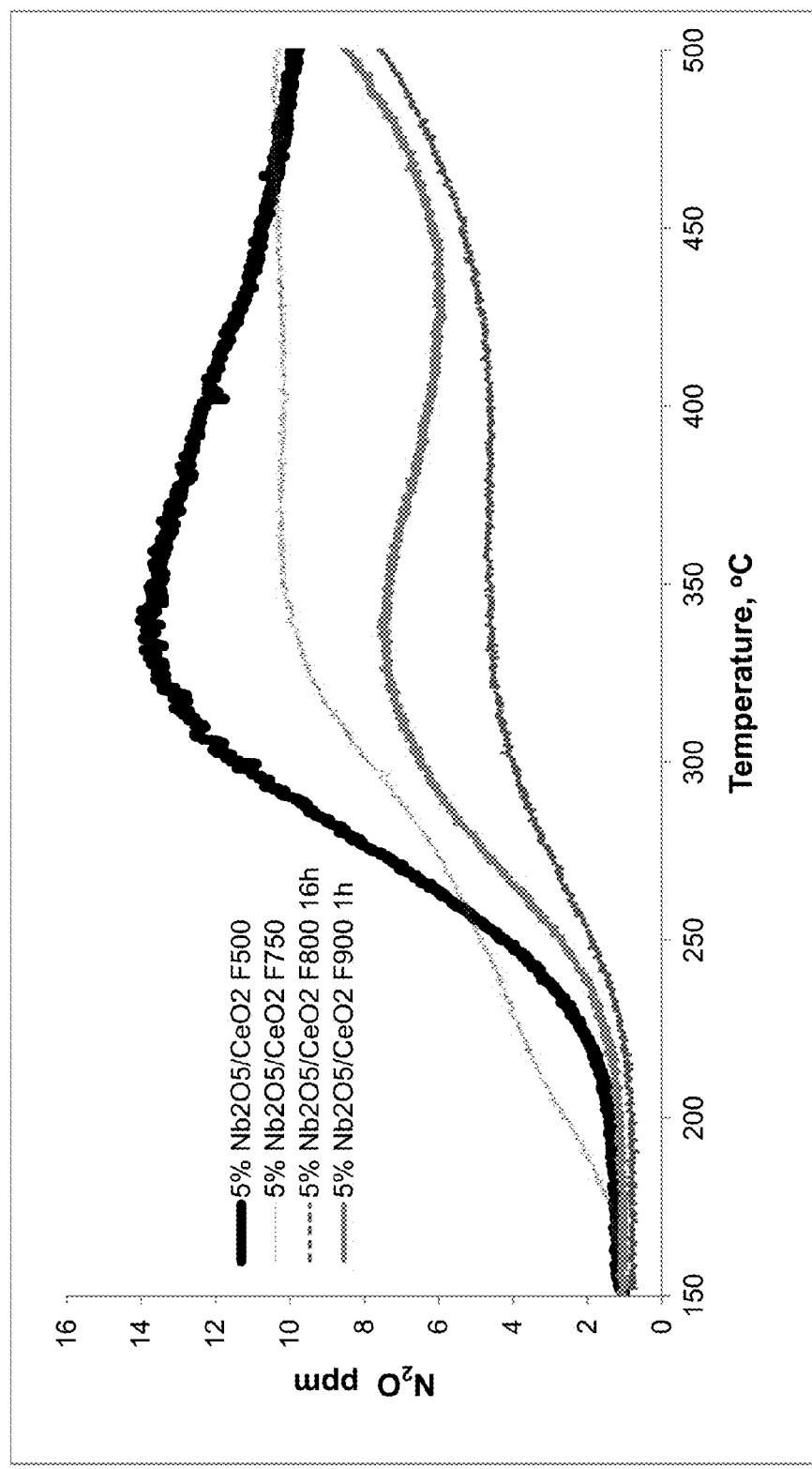
FIG. 6 shows the effect of calcination temperature on the amount of $N_2O$ formed in a NOx reduction process with 5% niobia doped on ceria.

Preferred catalysts will generate little or no nitrous oxide ($N_2O$). FIG. 6 shows that calcination at 750° C. to 900° C. of a 5% niobia-doped ceria catalyst generally reduces the amount of $N_2O$ formed in the SCR reduction process. However, all of the tested catalysts generate a relatively low (<15 ppm) level of $N_2O$.

Figure 7:
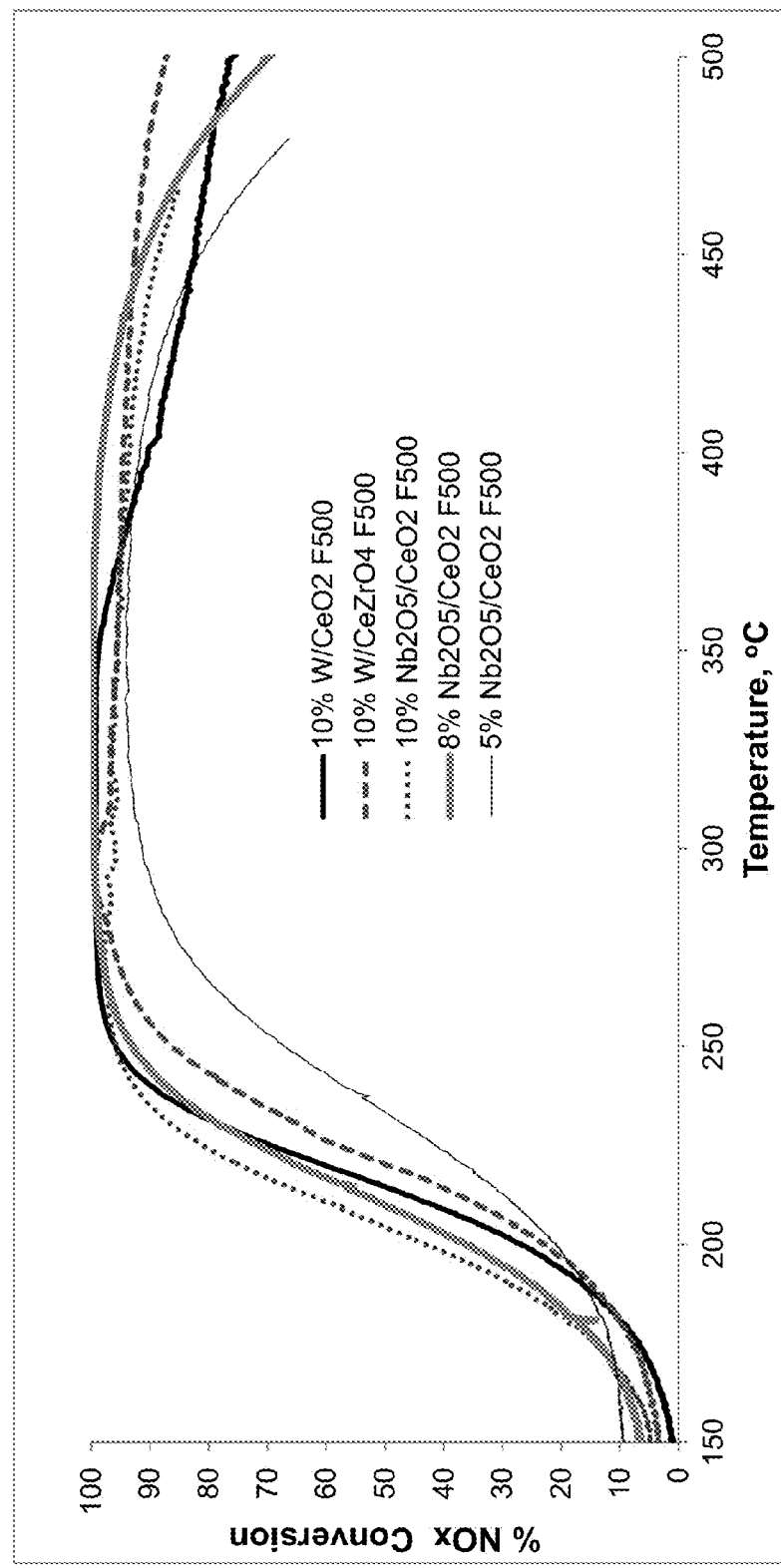
FIG. 7 plots NOx conversion versus temperature for various niobia-doped cerias and comparative tungsten catalysts.
Figure 8:
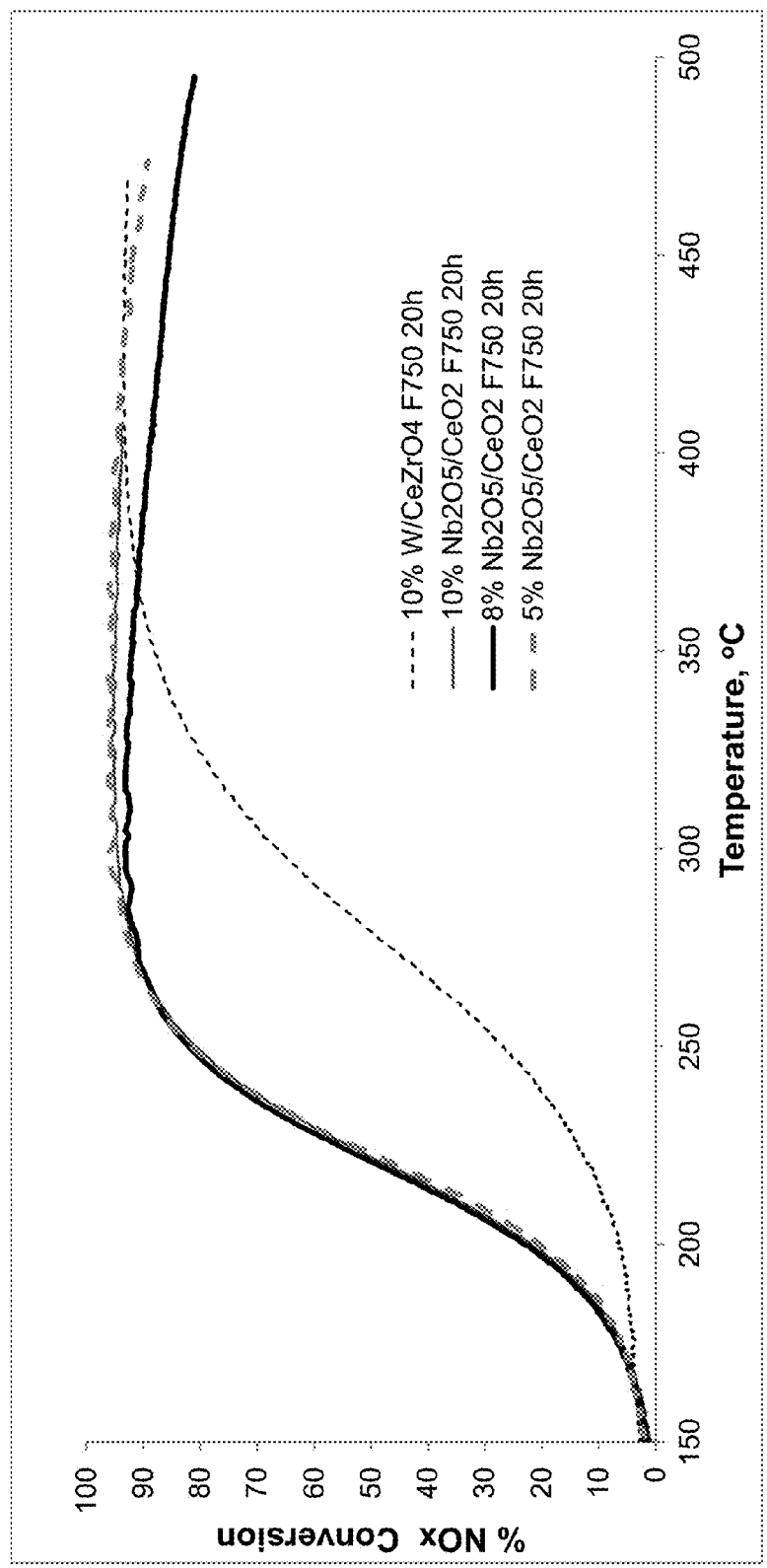
FIG. 8 illustrates the effect of prolonged calcination of niobia-doped cerias versus a comparative tungsten catalyst on NOx conversion performance.

FIG. 7 compares niobia-doped cerias (5-10 wt. % niobia) with tungsten on ceria or tungsten on a mixed oxide of ceria and zirconia. All of the catalysts, when calcined at 500° C., provide acceptable NOx conversion profiles in the target 200° C. to 500° C. range of interest for the SCR process. However, when the calcination temperature is increased to 750° C. and the heating time is extended (FIG. 8), the niobia-doped cerias retain high NOx conversion activities while the comparative tungsten catalyst has much lower activity.

Figure 9:
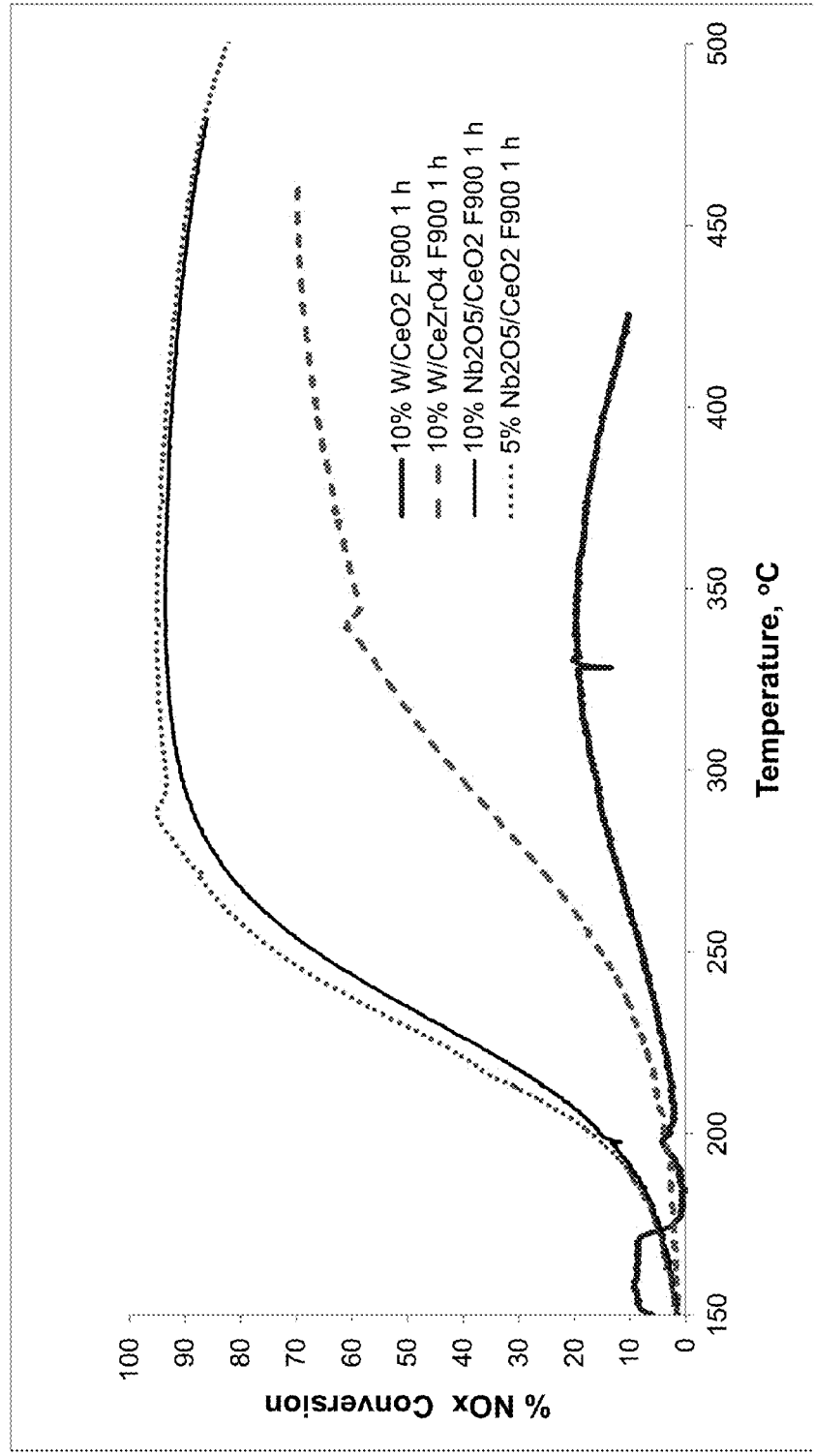
FIG. 9 shows the effect of calcining at 900° C. on the NOx conversion performance of niobia-doped cerias and comparative tungsten catalysts.

FIG. 9 shows the effect of calcining at 900° C. on the NOx conversion performance of niobia-doped cerias and comparative tungsten catalysts. As shown in the figure, the tungsten catalysts lose activity for NOx conversion upon calcination at 900° C., but the niobia-doped cerias maintain good activity after such a treatment.

Figure 10:
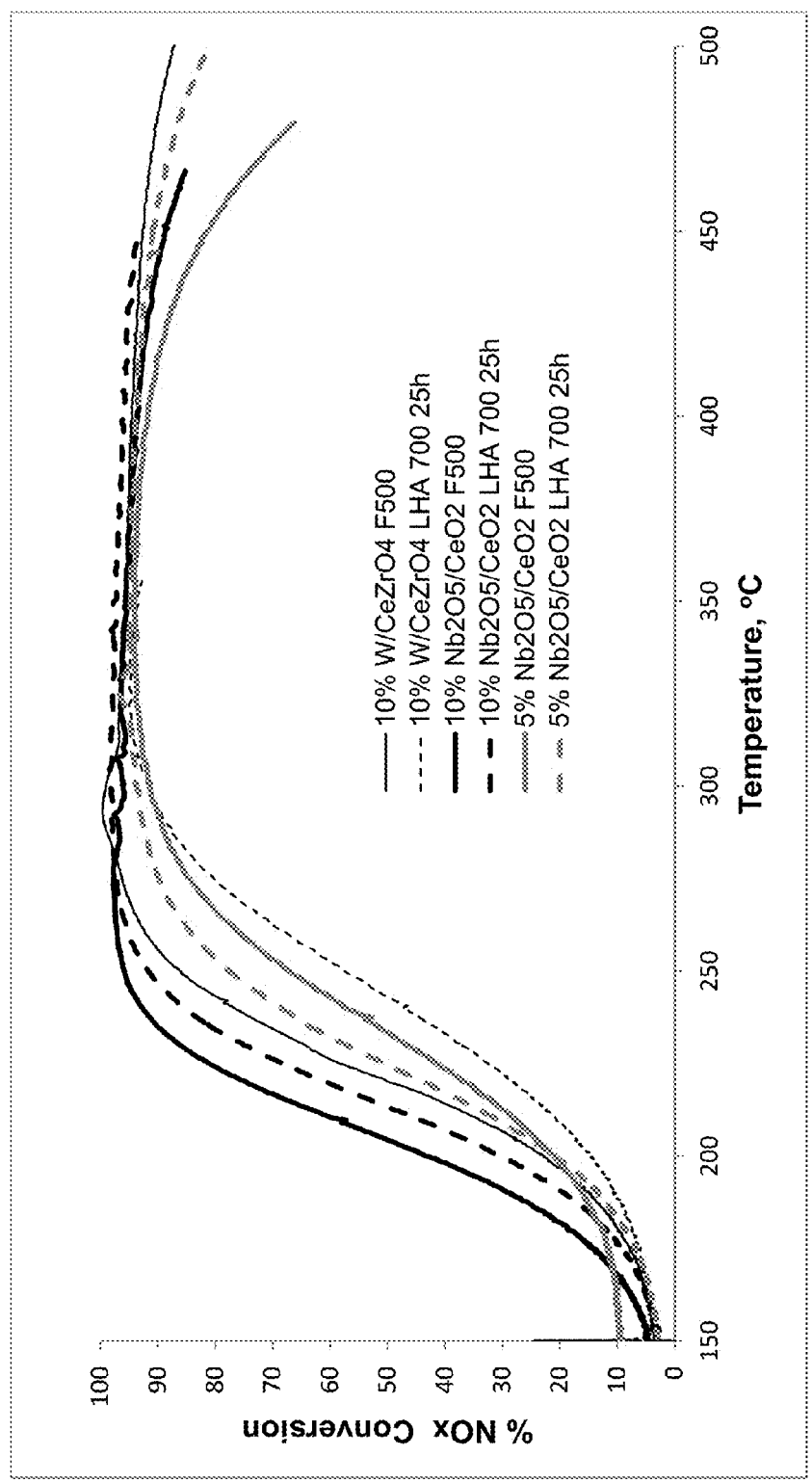
FIG. 10 shows the effect of lean hydrothermal aging (LHA) on the NOx conversion performance of niobia-doped cerias and a comparative tungsten catalyst.

The niobia-doped cerias also respond well to lean hydrothermal aging (FIG. 10). As shown in the figure, a comparative tungsten catalyst loses some NOx conversion activity when subjected to lean hydrothermal aging at 700° C. for 25 h. In contrast, the niobia-doped cerias are as good or better for NOx conversion after the LHA treatment.

Figure 11:
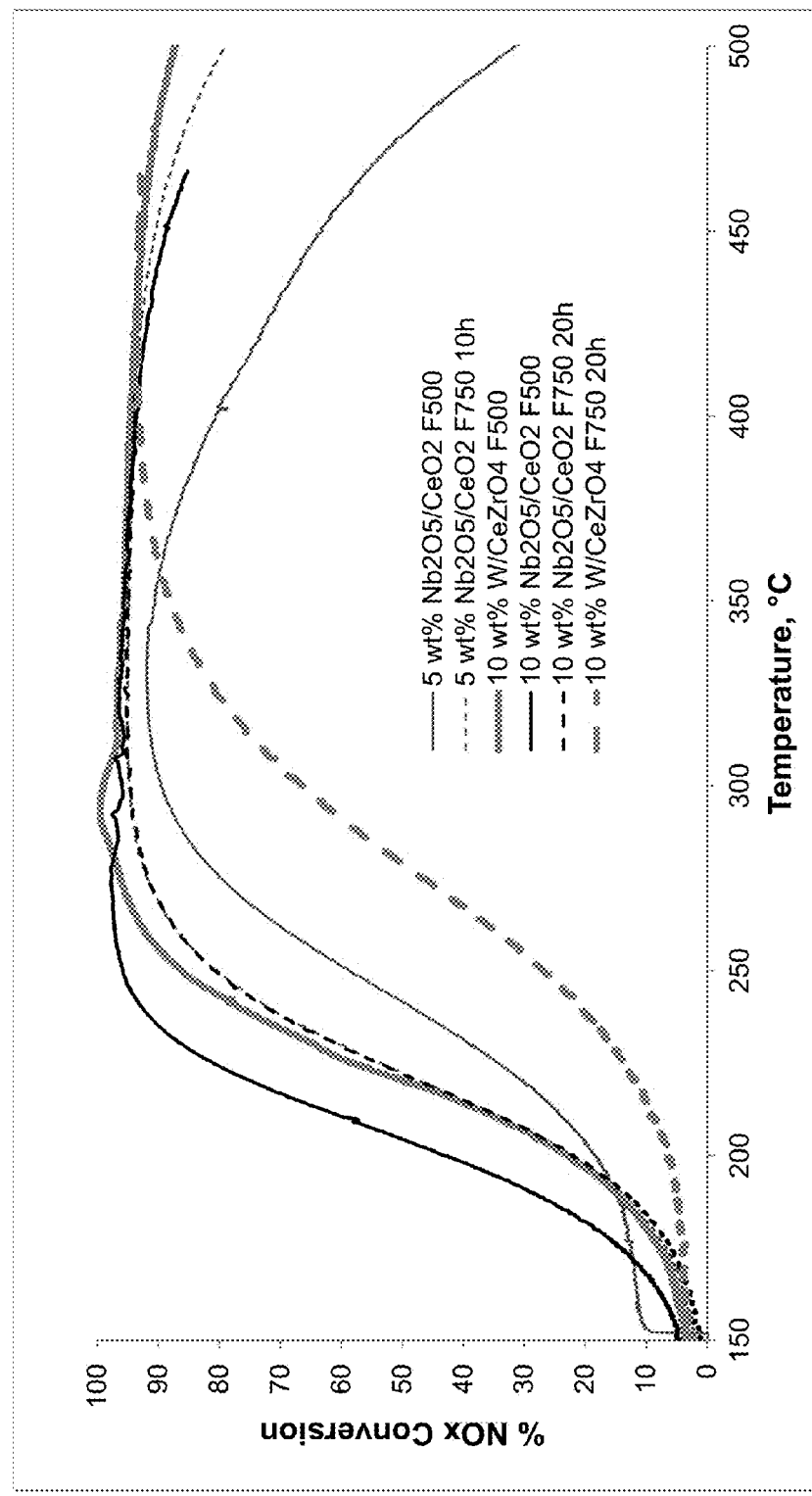
FIG. 11 plots NOx conversion versus temperature for various niobia-doped cerias and comparative tungsten catalysts and demonstrates the activating effect of calcination for the niobia-doped cerias.

FIG. 11 demonstrates the deactivating effect of calcination on the comparative tungsten catalyst, which contrasts with the relative robustness of the niobia-doped cerias. The 5 wt. % niobia on ceria catalyst becomes more active for NOx conversion on calcination at 750° C., while the 10 wt. % niobia on ceria catalyst is somewhat less active after calcination.

Figure 12:
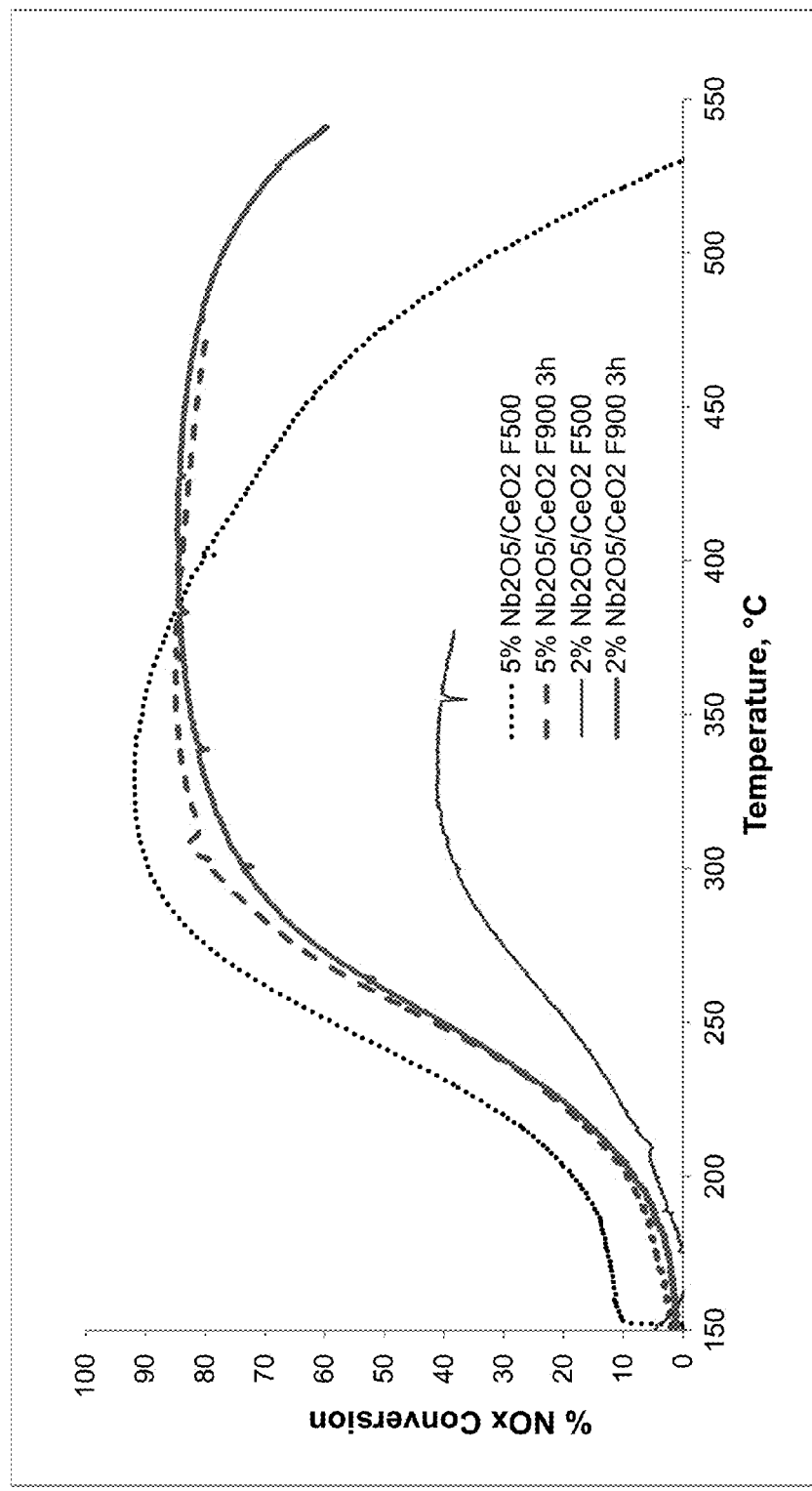
FIG. 12 compares NOx conversion versus temperature results for niobia-doped cerias and shows the activating effect of calcination at elevated temperature.

Further evidence for the activating effect of calcination appears in FIG. 12. NOx conversion versus temperature results for niobia-doped cerias (2 or 5 wt. % $Nb_2O_5$) are compared for catalysts calcined at 500° C. or 900° C. As shown in the figure, the 5 wt. % niobia catalyst calcined at 900° C. retains good activity at high (400-500° C.) SCR temperature. Interestingly, the 2 wt% niobia catalyst is far more active for NOx conversion after heating to 900° C. compared with the catalyst calcined at 500° C.

SCR Catalyst for Compact After-Treatment System
Preparation of Niobia-Doped Ceria Catalyst The procedure of Example 1 is generally followed to make a catalyst having 10 wt. % $Nb_2O_5$ doped on ceria. The catalyst is hydrothermally aged at 700° C. for 25 h prior to use.

Preparation of Fe/Zeolite Catalyst (Comparative)

A iron-exchanged ferrierite catalyst (3.0 wt. % Fe) is prepared as follows. Iron nitrate (3.246 g) is dissolved in deionized water (10 mL), and this solution is added in several steps to a commercial ammonium-exchanged ferrierite (15 g). The mixture is dried at 105° C. for a few hours and is then calcined at 500° C. for 2 h. The finished catalyst is subjected to lean hydrothermal aging at 700° C. for 25 h.

$NH_3$-SCR Activity Test Conditions

The procedure outlined above is generally followed. In some experiments, the following conditions are used: 250 ppm NO, 250 ppm $NO_2$, 500 ppm $NH_3$, 9% $O_2$, 5% $CO_2$, 5% $H_2O$, 300 ppm CO, balance $N_2$ at a space velocity of 30,000 $h^{-1}$.

Results

Figure 13:
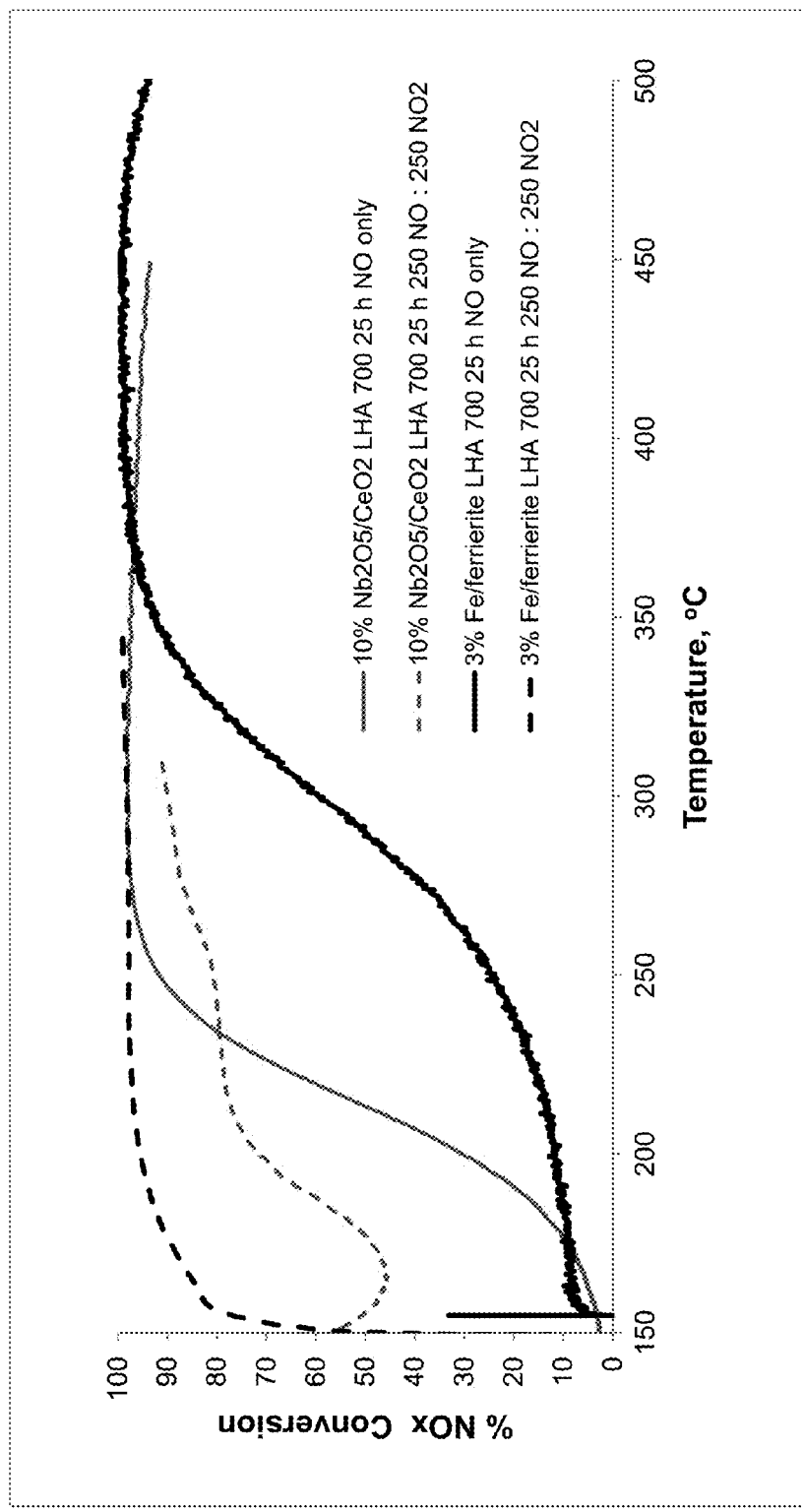
FIG. 13 shows NOx conversion versus temperature for lean hydrothermally aged niobia-doped cerias and comparative iron-exchanged ferrierites in the presence or absence of $NO_2$.
Figure 14:
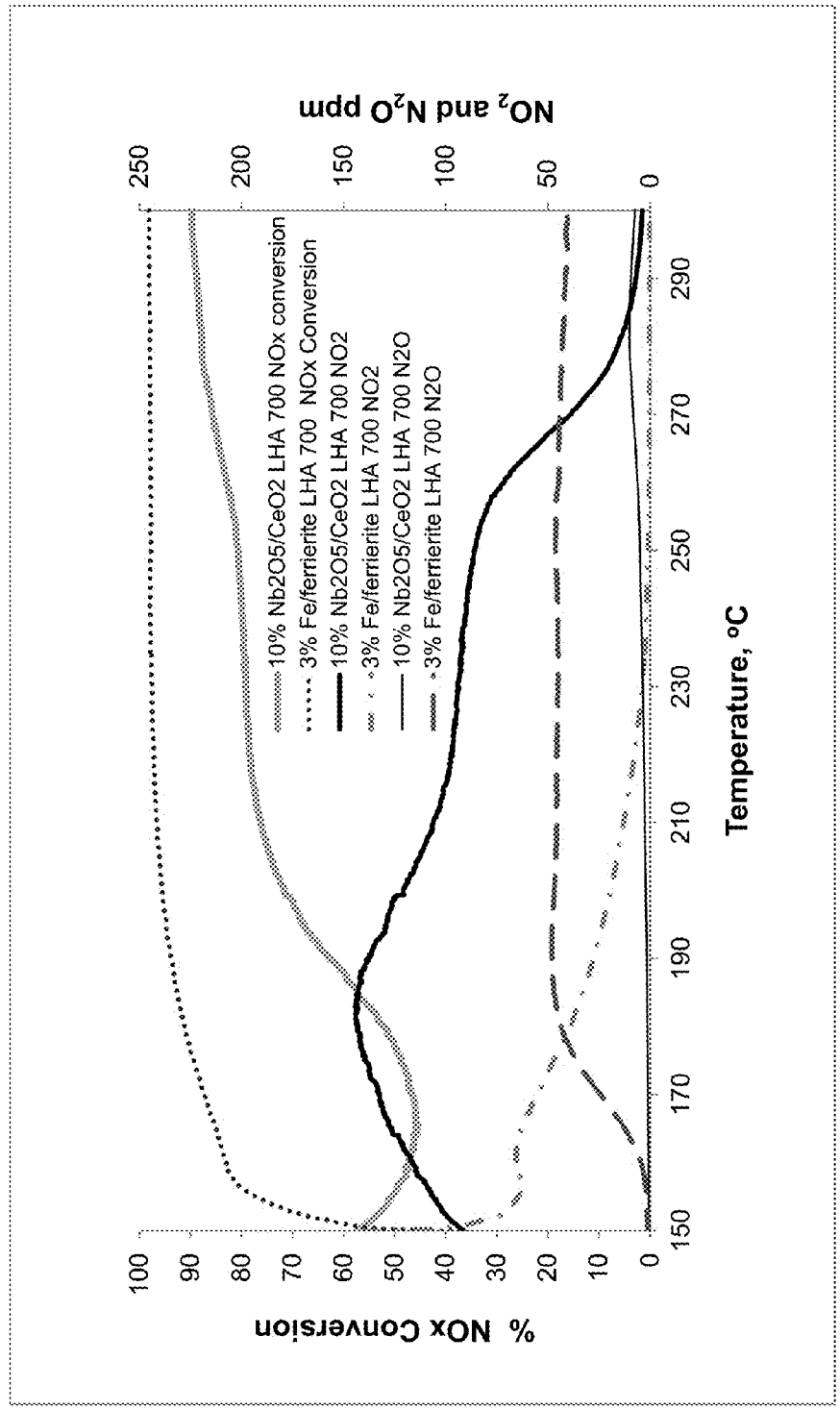
FIG. 14 plots NOx conversion, $NO_2$ concentration, and $N_2O$ concentration versus temperature for lean hydrothermally aged niobia-doped cerias and comparative iron-exchanged ferrierites.

FIGS. 13 and 14 show that the niobia-doped ceria catalyst has desirable attributes for use in a diesel particulate filter (DPF), especially when compared with a conventional iron-on-ferrierite SCR catalyst. In particular, the niobia-doped ceria catalyst has the ability to convert NOx while also maintaining a desirable level of $NO_2$. This $NO_2$ can be used to oxidize soot in an after-treatment system in which the inlets and outlets of the filter are coated with the catalyst. Compared with the iron catalyst, the niobia-doped ceria converts NOx less aggressively, generates less $N_2O$, and maintains a desirable level of $NO_2$, which would be available to oxidize soot.

The solid lines in FIG. 13 show that the niobia-doped catalyst is more effective than the iron-exchanged ferrierite in reducing NO at lower SCR reaction temperatures. When the gas mixture contains a 1:1 mixture of NO and $NO_2$, however, the iron catalyst is much more aggressive in converting all of the NOx present. In contrast, the niobia-doped ceria catalyst allows more NOx (including $NO_2$) to persist.

In FIG. 14, the NOx conversion curves from the 1:1 mixture of NO and $NO_2$ are shown again, along with the concentration of $NO_2$ and $N_2O$ present as a function of temperature. The niobia-doped ceria catalyst generates very little $N_2O$ compared with the iron-on-ferrierite catalyst. Interestingly, the level of $N_2O$ is maintained at a desirably high level (20-60 ppm). In contrast, the $NO_2$ level drops off dramatically for the comparative iron catalyst, which is consistent with its much faster NOx conversion rate.

The preceding examples are intended only as illustrations; the following claims define the scope of the invention.

We claim:

1. A process which comprises selectively reducing a gaseous mixture comprising nitrogen oxides in the presence of a reductant and a catalyst which comprises at least 91 wt. % of ceria and 0.1 to 9 wt. % of niobia or tantala doped on the ceria, wherein the catalyst is calcined at a temperature within the range of 600° C. to 1000° C., wherein the catalyst has a lattice parameter at least 0.02% less than that of undoped ceria.

2. The process of claim 1 wherein the reductant is a nitrogen compound.

3. The process of claim 1 wherein the reductant is ammonia.

4. The process of claim 1 performed at a temperature within the range of 100° C. to 650° C.

5. The process of claim 1 wherein the catalyst comprises at least 95 wt. % of ceria.

6. The process of claim 1 wherein the ceria has a surface area greater than 100 $m^2/g$.

7. The process of claim 1 wherein the catalyst comprises 1 to 5 wt. % of niobia or tantala.

8. The process of claim 1 wherein the catalyst has a lattice parameter at least 0.04% less than that of undoped ceria.

9. The process of claim 1 wherein the catalyst has, at its surface as measured by x-ray photoelectron spectroscopy, a molar ratio of niobium or tantalum to cerium that is at least doubled by the calcination.

10. The process of claim 1 wherein the catalyst has, at its surface as measured by x-ray photoelectron spectroscopy, a molar ratio of niobium or tantalum to cerium greater than 0.2.

11. The process of claim 1 wherein the catalyst has a distribution quotient, Q, greater than 1.5, wherein Q is given by:

$$Q=(E_{surface}/Ce_{surface}) / (E_{bulk}/Ce_{bulk})$$

wherein $E_{surface}/Ce_{surface}$ is the molar ratio of niobium or tantalum to cerium measured at the surface of the catalyst by x-ray photoelectron spectroscopy, and $E_{bulk}/Ce_{bulk}$ is the molar ratio of niobium or tantalum to cerium in a bulk sample of the catalyst.

12. The process of claim 11 wherein Q has a value from 2 to 10.

13. The process of claim 1 wherein the catalyst is prepared by impregnating ceria with a soluble niobium or tantalum salt, followed by calcination.

14. The process of claim 1 wherein the catalyst is prepared by co-precipitating a mixture comprising a cerium hydroxide and a niobium or tantalum hydroxide from an aqueous solution of soluble cerium and niobium or tantalum salts, washing the resulting precipitate, and calcining.

15. The process of claim 1 wherein the catalyst is calcined at a temperature within the range of 700° C. to 950° C.

16. A compact after-treatment system for a diesel vehicle, comprising: a diesel particulate filter having inlets and outlets, and a dual-function catalyst coated on the inlets, outlets, or both, wherein the catalyst comprises at least 80 wt. % of ceria and 0.1 to 20 wt. % of niobia or tantala doped on the ceria, wherein the catalyst is calcined at a temperature within the range of 600° C. to 1000° C., and wherein the catalyst has a lattice parameter at least 0.02% less than that of undoped ceria.

17. The after-treatment system of claim 16 wherein under normal operating conditions for the vehicle, the catalyst promotes selective catalytic reduction of gaseous mixtures comprising nitrogen oxides in the presence of a reductant while maintaining a nitrogen dioxide concentration adequate to allow the catalyst to passively oxidize soot.

18. The after-treatment system of claim 16 wherein the reductant is ammonia.

19. The after-treatment system of claim 16 wherein the catalyst comprises 1 to 15 wt. % of niobia or tantala.

20. The after-treatment system of claim 16 wherein the catalyst is calcined at a temperature within the range of 700° C. to 950° C.

21. A catalyst prepared by impregnating ceria with an aqueous solution comprising a water-soluble niobium or tantalum salt, and calcining the impregnated ceria at a temperature within the range of 600° C. to 1000° C.; wherein the catalyst comprises at least 91 wt. % of ceria and 0.1 to 9 wt. % of niobia or tantala doped on the ceria, and wherein the catalyst has a lattice parameter at least 0.02% less than that of undoped ceria.

* * * * *